US011259237B2

(12) United States Patent
John Wilson et al.

(10) Patent No.: US 11,259,237 B2
(45) Date of Patent: Feb. 22, 2022

(54) SYSTEM AND METHOD FOR LOCATING A DOWNLINK DATA CHANNEL

(71) Applicant: QUALCOMM Incorporated, San Diego, CA (US)

(72) Inventors: Makesh Pravin John Wilson, San Diego, CA (US); Hung Dinh Ly, San Diego, CA (US); Heechoon Lee, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 16/244,743

(22) Filed: Jan. 10, 2019

(65) Prior Publication Data

US 2019/0223084 A1 Jul. 18, 2019

Related U.S. Application Data

(60) Provisional application No. 62/617,598, filed on Jan. 15, 2018.

(51) Int. Cl.
| | |
|---|---|
| *H04W 4/00* | (2018.01) |
| *H04W 48/12* | (2009.01) |
| *H04L 5/00* | (2006.01) |
| *H04W 48/10* | (2009.01) |
| *H04W 76/11* | (2018.01) |

(Continued)

(52) U.S. Cl.
CPC ........... *H04W 48/12* (2013.01); *H04L 5/0044* (2013.01); *H04L 5/0053* (2013.01); *H04L 5/0094* (2013.01); *H04L 27/2666* (2013.01); *H04W 48/10* (2013.01); *H04W 74/008* (2013.01); *H04W 76/11* (2018.02); *H04J 11/0069* (2013.01)

(58) Field of Classification Search
None
See application file for complete search history.

(56) References Cited

U.S. PATENT DOCUMENTS

| | | | |
|---|---|---|---|
| 2018/0192383 A1* | 7/2018 | Nam | ..................... H04J 11/0073 |
| 2019/0150121 A1* | 5/2019 | Abdoli | .................. H04L 5/0092 370/329 |

FOREIGN PATENT DOCUMENTS

WO  WO-2019050379 A1 * 3/2019 ........... H04L 5/0053

OTHER PUBLICATIONS

International Search Report and Written Opinion—PCT/US2019/013297—ISA/EPO—dated Mar. 22, 2019.

(Continued)

*Primary Examiner* — Zewdu A Beyen
(74) *Attorney, Agent, or Firm* — Arent Fox, LLP

(57) ABSTRACT

An apparatus may receive a master information block and a synchronization signal (SS) block on a PBCH. The MIB may indicate an allocation associated with a CORESET. The apparatus may receive remaining minimum system information (RMSI) configuration information carried in the CORESET based on the allocation associated with the CORESET. The apparatus may determine a position associated with a downlink data channel based on a first value indicated by one of the MIB or the SS block in the PBCH and based on a second value indicated by the RMSI configuration information. The apparatus may receive data carried on the downlink data channel based on the position associated with the downlink data channel.

30 Claims, 11 Drawing Sheets

(51) Int. Cl.
*H04L 27/26* (2006.01)
*H04W 74/00* (2009.01)
*H04J 11/00* (2006.01)

(56) References Cited

OTHER PUBLICATIONS

ITL: "On Remaining Details of SS/PBCH Block", 3GPP Draft; R1-1720563 SS Block, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 17, 2017 (Nov. 17, 2017), 6 Pages, XP051369039, Retrieved from the Internet: URL: https://www.3gpp.org/ftp/tsg_ran/WG1_RL1/TSGR1_91/Docs/ [retrieved on Nov. 17, 2017], Section 2.

Zte., et al., "Remaining Details of Synchronization Signal Design", 3GPP Draft; R1-1719340, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 18, 2017 (Nov. 18, 2017), 4 Pages, XP051369269, Retrieved from the Internet: URL: https://www.3gpp.org/ftp/tsg_ran/WG1_RL1/TSGR1_91/Docs/ [retrieved on Nov. 18, 2017], Sections 2-4.

\* cited by examiner

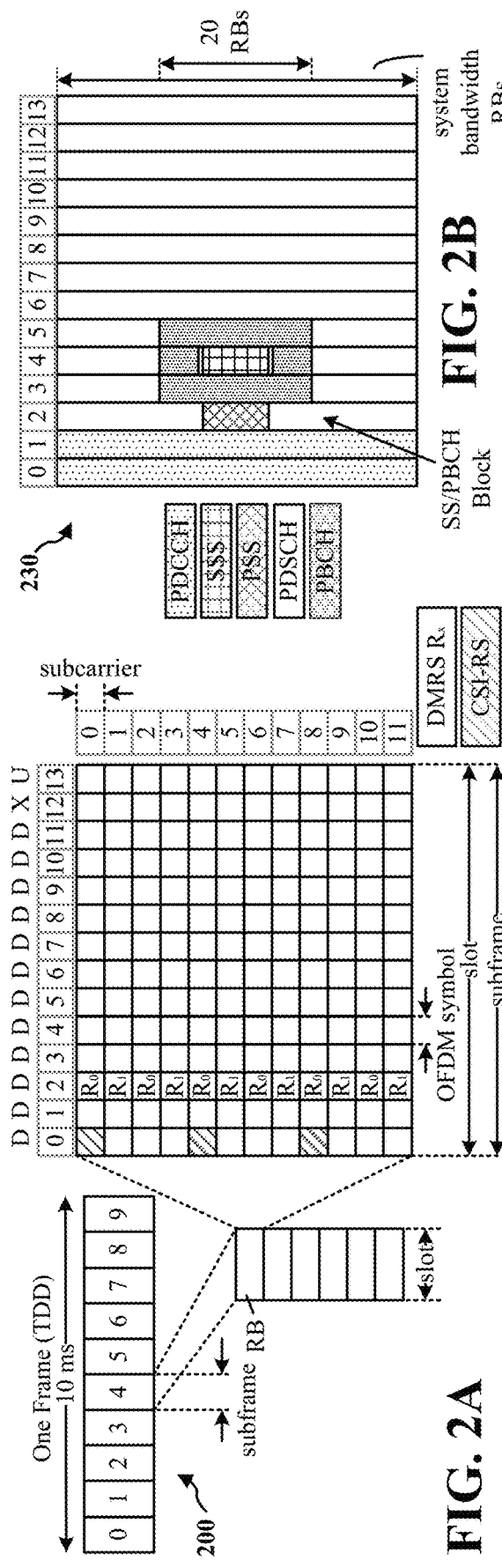
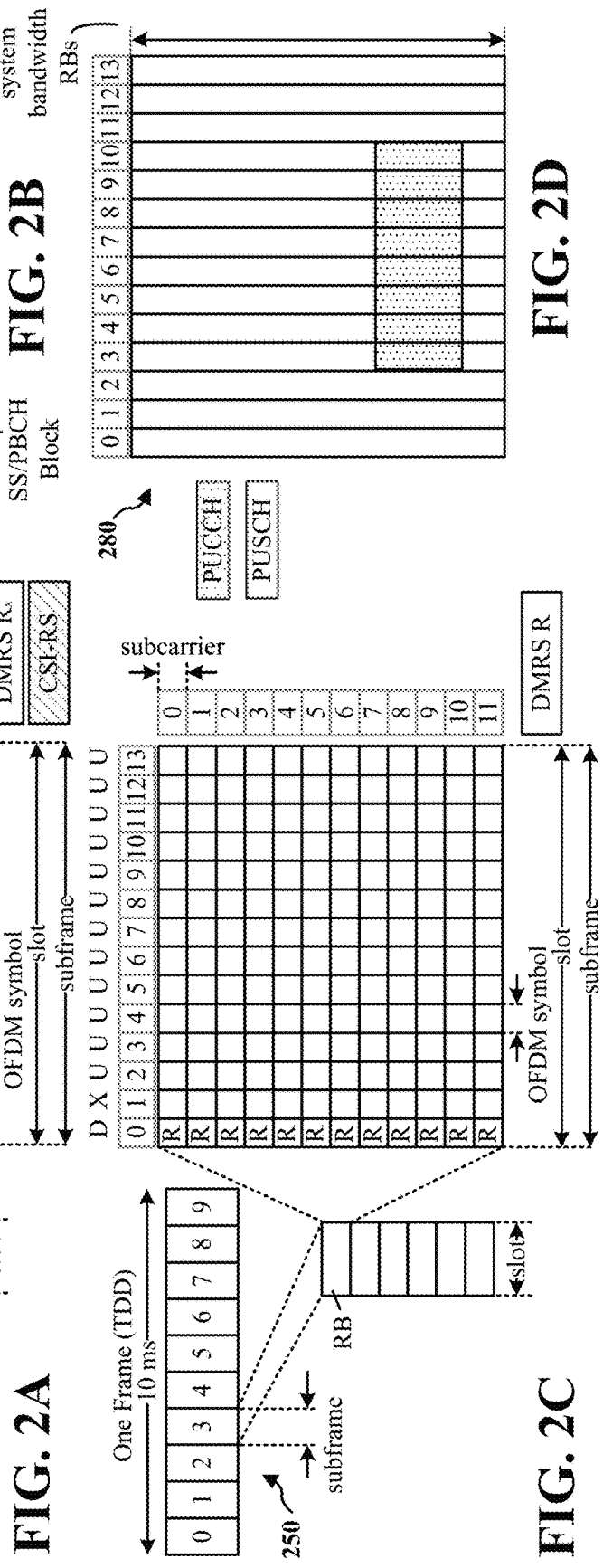
FIG. 2A
FIG. 2B
FIG. 2C
FIG. 2D

SYSTEM AND METHOD FOR LOCATING A DOWNLINK DATA CHANNEL

CROSS-REFERENCE TO RELATED APPLICATION(S)

This application claims the benefit of U.S. Provisional Application Ser. No. 62/617,598, entitled "SYSTEM AND METHOD FOR LOCATING A DOWNLINK DATA CHANNEL" and filed on Jan. 15, 2018, which is expressly incorporated by reference herein in its entirety.

BACKGROUND

Technical Field

The present disclosure relates generally to communication systems, and more particularly, to a base station configured to indicate system information to a user equipment.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When operating according to at least one radio access technology (RAT), a base station may send information indicating how a user equipment (UE) may acquire various channels in order to operate on a cell provided by the base station. For example, in a 5G New Radio (NR) RAT, a base station may broadcast information for acquiring control information and the control information may indicate how a data channel is to be acquired. In some aspects, a base station (e.g., a gNB) may send an information block (e.g., master information block) on a physical broadcast channel (PBCH). The information block may include information indicating a position of a control resource set (CORESET). The CORESET may include downlink control information (DCI), and a position of a downlink data channel may be determined from the DCI carried in the CORESET.

A UE may receive the information block carried on the PBCH from the base station, and the UE may determine the position of the CORESET based on the information block. When the UE receives the CORESET, the UE may receive DCI in the CORESET. From the DCI, the UE may determine a portion of the information needed to receive a downlink data channel. However, the DCI may not indicate all of the information needed to acquire a position of the downlink data channel.

The position of the downlink data channel may be based on time domain information, which may indicate at least a starting position and an ending position of the downlink data channel. For example, time domain information may indicate at least a starting symbol of the downlink data channel and an allocation of a number of symbols of the downlink data channel from the starting symbol to an ending symbol. The base station may signal the time domain information to the UE in order for the UE to determine the position of the downlink data channel.

However, explicitly signaling the time domain information may incur overhead that may be unsuitable for one or more RATs (e.g., a 5G NR RAT). For example, signaling a bitmap indicating time domain patterns for acquiring a downlink data channel may be relatively expensive with respect to over-the-air signaling, and may exceed the capacity of DCI messaging. Therefore, an improved approach to signaling time domain information indicating a position of a downlink data channel within the standards of one or more RATs may be beneficial. Such an approach may avoid explicitly signaling every time domain pattern for acquiring a position of a downlink data channel. Instead, implicit signaling or a combination of implicit and explicit signaling may be used to convey time domain information for acquiring a position of a downlink data channel. Such an approach may reduce over-the-air signaling while conforming to the standards of one or more RATs.

In one aspect of the disclosure, a method, a computer-readable medium, and an apparatus are provided. The apparatus may receive a master information block (MIB) and a synchronization signal (SS) block in a PBCH. The MIB may indicate an allocation associated with a CORESET. The apparatus may receive remaining minimum system information (RMSI) configuration information carried in the CORESET based on the allocation associated with the CORESET. The apparatus may determine a position associated with a downlink data channel based on a first value indicated by one of the MIB or the SS block in the PBCH and based on a second value indicated by the RMSI configuration information. The apparatus may receive data carried on the downlink data channel based on the position associated with the downlink data channel. In an aspect, the downlink data channel comprises a physical downlink shared channel (PDSCH), and the received data comprises RMSI. In an aspect, the RMSI configuration information is included in a payload of DCI. In one aspect, the DCI may be Format 1_0. In an aspect, the first value comprises one of: a multiplexing pattern, a symbol index for a search space set, a number of symbols associated with the CORESET, a number of search space sets per slot, a minimum system bandwidth, or an SS block index. In an aspect, the determination of the position associated with the downlink data channel comprises to determine, based on the MIB in the PBCH, at least one of the multiplexing pattern, the symbol index for the search space set, the number of symbols associated with the CORESET, or the number of search space sets per slot, and the first value is based on the at least one of the multiplexing pattern, the symbol index for the search space set, the number of symbols associated with the CORESET, or the number of search space sets per slot. In an aspect, the determination of the position associated with the downlink data channel comprises to detect at least one of the minimum system bandwidth or the SS block index based on the one of the MIB or the SS block in the PBCH, and the first value is based on the at least one of the minimum system bandwidth or the SS block index. In an aspect, the determination of the position associated with the downlink data channel comprises to decode the RMSI configuration information based on a radio network temporary identifier (RNTI) associated with the UE, and the second value is based on the decoded RMSI configuration information. In an aspect, the RNTI comprises one of a cell RNTI (C-RNTI), a temporary C-RNTI (TC-RNTI), a random access RNTI (RA-RNTI), a system information RNTI (SI-RNTI), or a paging RNTI (P-RNTI). In an aspect, the position of the downlink data channel is indicated by an entry in a table, and the entry in the table corresponds with the first value and the second value. In an aspect, the apparatus may receive the table via RRC signaling. In an aspect, the position associated with the downlink data channel comprises at least one of a starting symbol and a number of consecutive symbols associated with the data carried on the downlink data channel, or a start and length indicator value (SLIV) that is based on the starting symbol and the number of consecutive symbols associated with the data carried on the downlink data channel.

In another aspect of the disclosure, a method, a computer-readable medium, and an apparatus are provided. The apparatus may send an MIB and an SS block in a PBCH, and the MIB may indicate an allocation associated with a CORESET. The apparatus may send RMSI configuration information carried in the CORESET based on the allocation associated with the CORESET. The apparatus may determine a position associated with a downlink data channel, the position associated with the downlink data channel corresponding to a first value indicated by one of the MIB or the SS block in the PBCH and a second value indicated by the RMSI configuration information. The apparatus may send data on the downlink data channel based on the position associated with the downlink data channel. In an aspect, the downlink data channel comprises a PDSCH, and the data on the downlink data channel comprises RMSI. In an aspect, the RMSI configuration information is included in a payload of DCI. In one aspect, the DCI may be Format 1_0. In an aspect, the apparatus may send, via RRC signaling, a table indicating the determined position and indicating the correspondence of the determined position to the first value indicated by the one of the MIB or the SS block in the PBCH and the second value indicated by the RMSI configuration information. In an aspect, the first value comprises one of: a multiplexing pattern, a symbol index for a search space set, a number of symbols associated with the CORESET, a number of search space sets per slot, a minimum system bandwidth, or an SS block index. In an aspect, the apparatus may scramble the RMSI configuration information based on an RNTI associated with a UE, the RMSI configuration information indicating the second value. In an aspect, the RNTI comprises one of a C-RNTI, a TC-RNTI, a RA-RNTI, a SI-RNTI, or a P-RNTI. In an aspect, the position associated with the downlink data channel comprises at least one of a starting symbol and a number of consecutive symbols associated with the data carried on the downlink data channel, or a SLIV that is based on the starting symbol and the number of consecutive symbols associated with the data carried on the downlink data channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
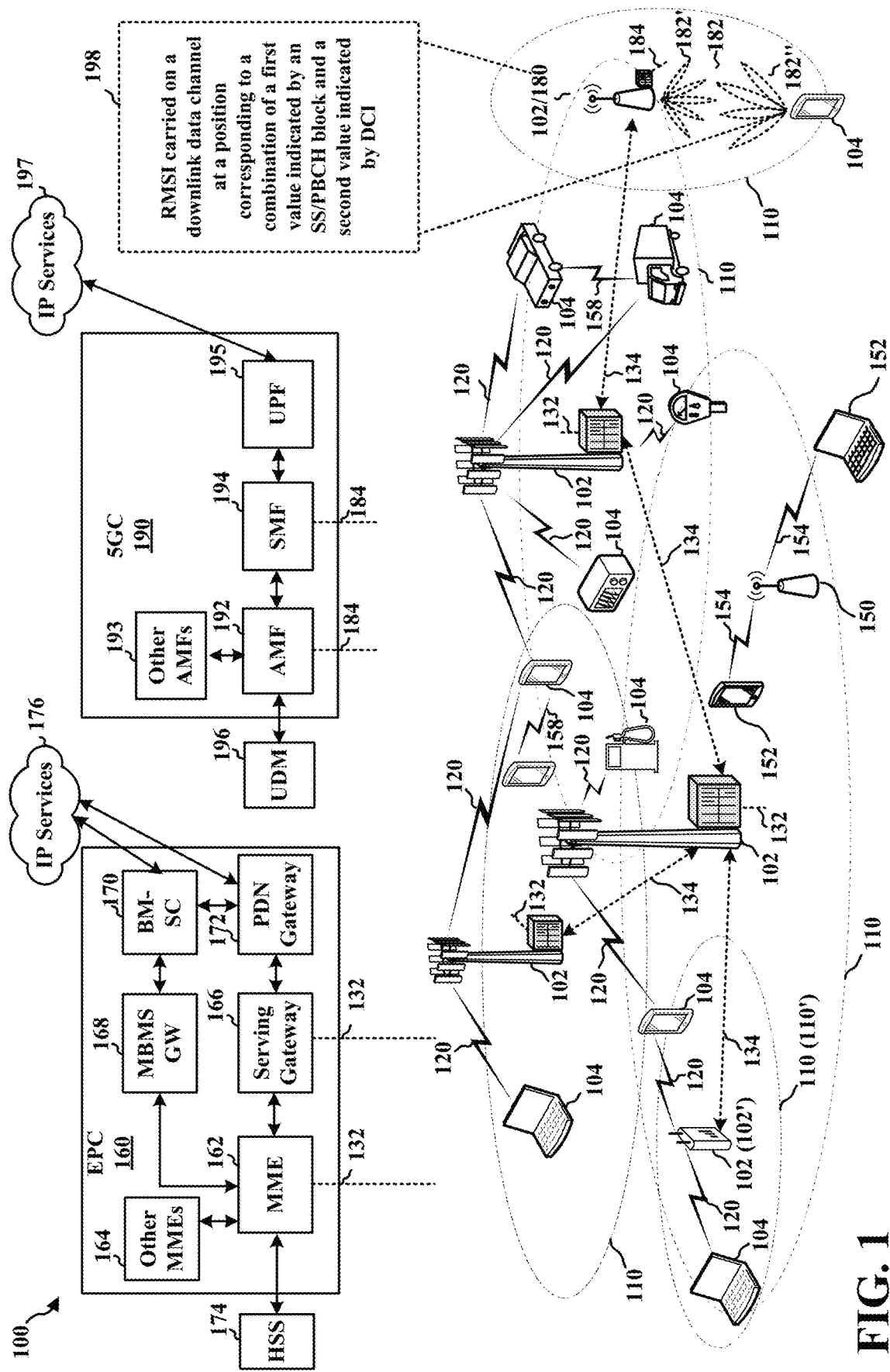
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine a position associated with a downlink data channel based on a first value indicated by a master information block and/or a synchronization signal block in a physical broadcast channel received from the base station 102/180 and based on a second value indicated by downlink control information (e.g., downlink control information of Format 1_0) received from the base station 102/180. The UE 104 may then receive, from the base station 102/180, remaining minimum system information (RMSI) 198 at the determined position on the downlink data channel.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
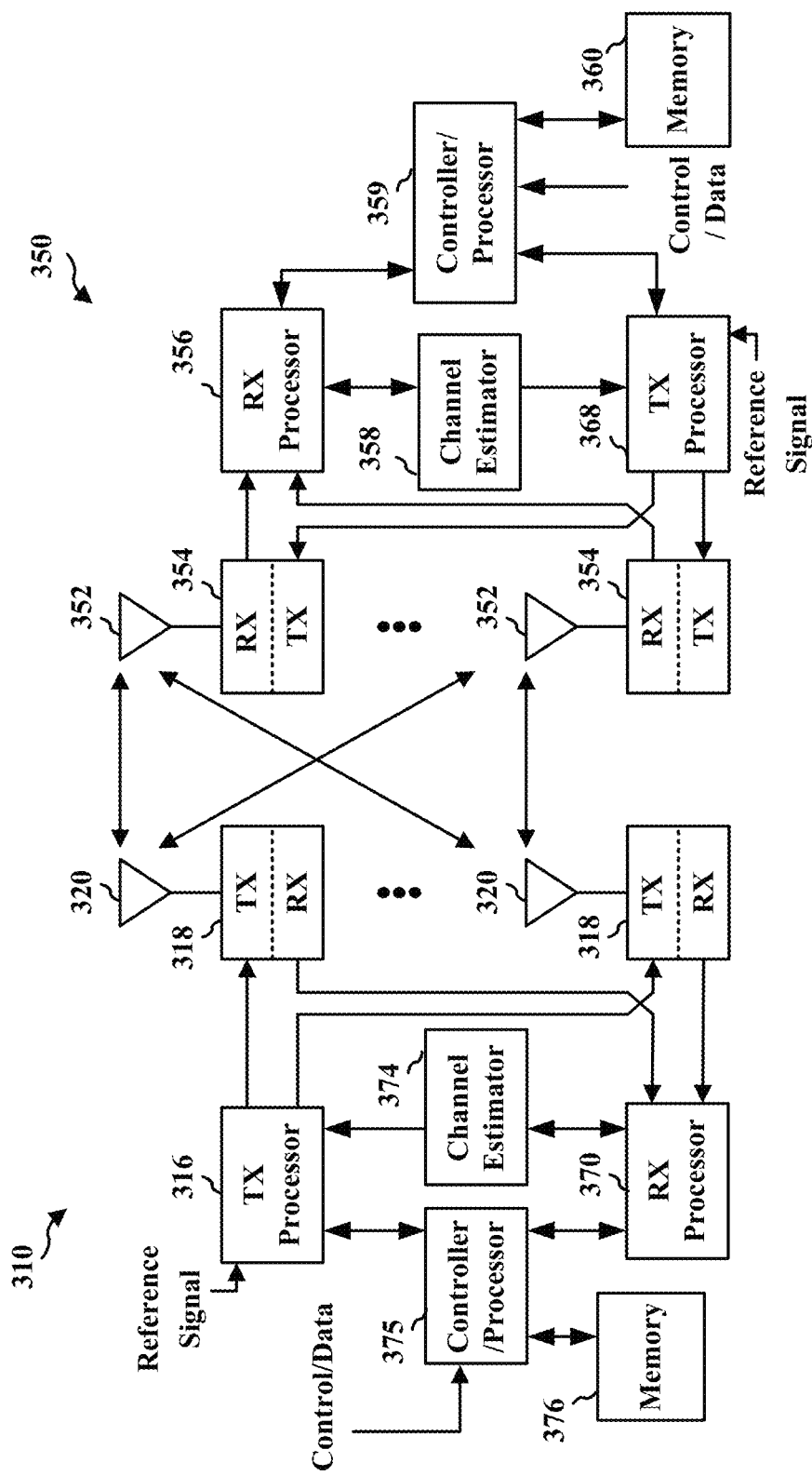
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be determined from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

With reference to FIGS. 4-11, the present disclosure may describe aspects of signaling time domain information to a UE for receiving a downlink data channel. For example, aspects of the present disclosure may describe signaling time domain information associated with RMSI carried on a PDSCH. A base station may use implicit signaling or a combination of implicit and explicit signaling to indicate the time domain information to the UE.

In some aspects, the base station may indicate, to the UE, time domain information for receiving the downlink data channel using a combination of information included in an MIB and information included in DCI (e.g., DCI of Format 1_0). In so doing, over-the-air signaling may be reduced relative to explicitly signaling, to the UE, every time domain pattern for receiving a downlink data channel, while also adhering to standards for a RAN in which the base station and the UE operate. In addition, implicit signaling or a combination of implicit and explicit signaling to indicate the time domain information to the UE may avoid ambiguity that might otherwise occur when attempting to explicitly signal time domain patterns within the relatively limited amount of available payload bits of DCI (e.g., DCI of Format 1_0).

Figure 4:
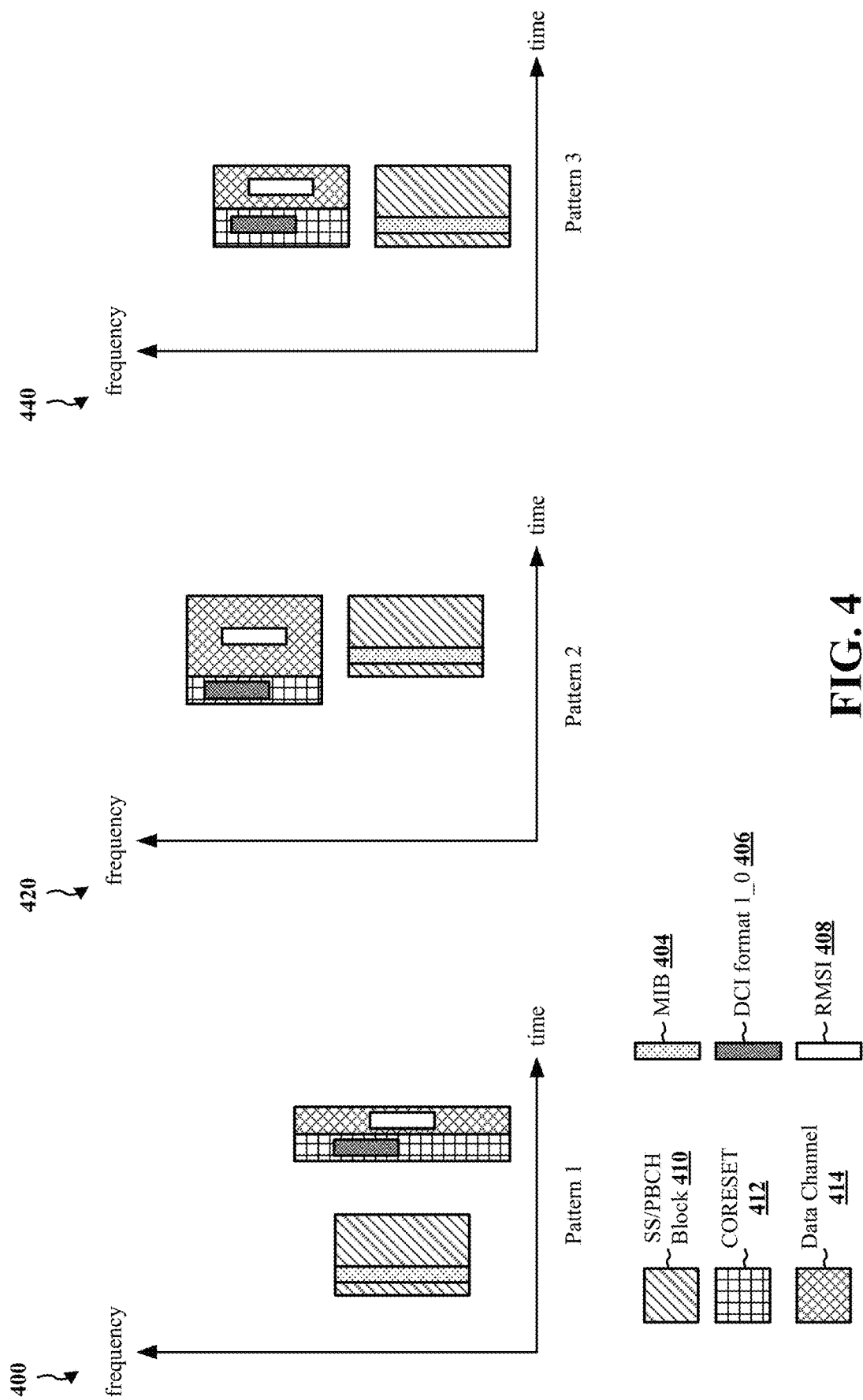
FIG. 4 is a block diagram illustrating examples of multiplexing patterns.

FIG. 4 is a block diagram that illustrates various patterns 400, 420, 440 for transmission on an SS/PBCH block 410, a CORESET 412, and a downlink data channel 414. FIG. 4 illustrates three possible multiplexing patterns 400, 420, 440. However, different multiplexing patterns and/or additional multiplexing patterns may be implemented in various aspects. A multiplexing pattern may be related to an SS block of the SS/PBCH block 410 and a CORESET 412 multiplexing pattern.

Each of the SS/PBCH block 410, the CORESET 412, and the downlink data channel 414 may carry data and/or control information. Specifically, an MIB 404 may be included in an SS/PBCH block 410 (e.g., the SS/PBCH block 410 may include other resources apart from those allocated for synchronization signals and/or reference signals, such as resources allocated for the MIB 404). Further, DCI 406 (e.g., DCI of Format 1_0) may be carried on a CORESET 412, and RMSI 408 may be carried on the downlink data channel 414 (e.g., PDSCH). In other words, resources of the SS/PBCH block 410 may be allocated for the MIB 404, resources of the CORESET 412 may be allocated for the DCI 406 (e.g., DCI of Format 1_0), and resources of the downlink data channel 414 may be allocated for the RMSI 408.

In FIG. 4, the exemplary allocations are to be regarded as illustrative and, therefore, the patterns 400, 420, 440 may not necessarily depict the actual or relative time and/or frequency resources allocated for the MIB 404, DCI 406, and RMSI 408 on the SS/PBCH block 410, the CORESET 412, and the downlink data channel 414, respectively. For example, the MIB 404, DCI 406, and RMSI 408 may occur in more or fewer symbols and/or different bandwidth parts of the SS/PBCH block 410, the CORESET 412, and the downlink data channel 414, respectively.

Beginning first with the SS/PBCH block 410, a minimum system bandwidth may be indicated based on the signals included in the SS/PBCH block 410. For example, the PSS, SSS, and PBCH transmission may define the minimum component carrier bandwidth. Further, the SS/PBCH block 410 may indicate the index of the SS/PBCH block 410, such as an index corresponding to a beam on which the SS/PBCH block 410 is transmitted.

The MIB 404 included in the SS/PBCH block 410 may include system information and/or information for initial access, cell acquisition, etc. Specifically, the MIB 404 may include, inter alia, an SFN, an indication of subcarrier spacing (e.g., for a SIB1, for RMSI, and/or for one or more RACH messages), a subcarrier offset (e.g., a frequency domain offset between the SS/PBCH block 410 and an overall resource block grid), and a position of a downlink DM-RS (e.g., a first downlink DM-RS).

In addition, the MIB 404 may indicate information associated with a PDCCH. The MIB 404 may include a PDCCH configuration field having a plurality of bits (e.g., eight bits), a first set of which may be the most significant bits (e.g., the first four bits) and a second set of which may be the least significant bits (e.g., the last four bits). The most significant bits of the PDCCH configuration field may indicate information defining the CORESET 412. The least significant bits of the PDCCH configuration field may indicate a monitoring occasion for a PDCCH in the CORESET 412.

According to various aspects, the most significant bits of the PDCCH configuration field may be at least a portion of an index for a first predefined table that indicates information defining the CORESET 412. The first predefined table may be selected based on the subcarrier spacing of the SS/PBCH block 410, the subcarrier spacing of the PDCCH, and a minimum bandwidth. Similarly, the least significant bits of the PDCCH configuration field may be at least a portion of an index for a second predefined table that indicates the monitoring occasion for a PDCCH in the CORESET 412. The first and/or second predefined tables may be defined by one or more standards for a RAN in which the UE and the base station operate (e.g., one or more 3GPP standards associated with 5G NR). In some aspects, the first and/or second predefined tables may be stored in the UE.

The most significant bits of the PDCCH configuration field may indicate a multiplexing pattern for at least the SS/PBCH block 410 and the CORESET 412, examples of which are shown with respect to the first pattern 400, the second pattern 420, and the third pattern 440. The most significant bits of the PDCCH configuration information may further indicate a number of resource blocks of the CORESET 412, a number of symbols of the CORESET 412, and an offset value of a number of resource blocks that the CORESET 412 is offset from the SS/PBCH block 410. For example, the most significant bits of the PDCCH configuration field may be at least a portion of an index for a first predefined table in which the preceding information is indicated, and the first predefined table may be selected based on the subcarrier spacing of the SS/PBCH block 410, the subcarrier spacing of the PDCCH, and a minimum system bandwidth.

The least significant bits of the PDCCH configuration field may indicate a number of search space sets per slot to be monitored, a first symbol index to be monitored for a search space set, and a first slot index to be monitored for a search space set. For example, the least significant bits of the PDCCH configuration field may be at least a portion of an index for a predefined table in which the preceding information is indicated, and the predefined table may be selected based in the CORESET multiplexing pattern (e.g., one of the multiplexing patterns 400, 420, 440 determined from the most significant bits of the PDCCH configuration field), a frequency range, the subcarrier spacing of the SS/PBCH block 410, and the subcarrier spacing of the PDCCH.

A UE may monitor for and acquire a PDCCH in the CORESET 412 based on the information indicated by the MIB 404. When the UE acquires the PDCCH in the CORESET 412, the UE may receive and decode a DCI message carried in the CORESET 412. Specifically, the UE may receive and decode DCI 406 that indicates scheduling information associated with a downlink data channel 414 (e.g., PDSCH) in a cell provided by a base station.

The DCI 406 may include a payload having at least one field of a relatively limited size (e.g., four bits). For example, the at least one field may indicate a time domain resource assignment. The payload may be scrambled with a radio network temporary identifier (RNTI) of a UE. A UE may be configured to decode the payload using an RNTI. An RNTI used to decode the payload may be one of a cell RNTI (C-RNTI), a temporary C-RNTI (TC-RNTI), a random access RNTI (RA-RNTI), a system information RNTI (SI-RNTI), a paging RNTI (P-RNTI), a configured scheduling RNTI (CS-RNTI), or a modulation coding scheme (MCS) C-RNTI (MCS-C-RNTI).

Decoding the payload of the DCI 406 with an RNTI may yield a value of the at least one field (e.g., a four-bit value). Because the payload may be decoded with one of a plurality of RNTIs, the value of the at least one field may vary according to the RNTI used to decode the payload.

Based on the value obtained from decoding the payload of the DCI 406 and further based on at least one value obtained from the SS/PBCH block 410, a position of the downlink data channel 414 may be determined, as described herein (e.g., with respect to FIGS. 5-11, infra). The position of the downlink data channel 414 may include a start and length value indicator (SLIV) of RMSI 408 carried on the downlink data channel 414.

The RMSI 408 may indicate system information, such as at least a portion of the system information carried in a SIB1. For example, the RMSI 408 may indicate whether a UE is allowed to access a cell, scheduling-related system information (e.g., information for one or more uplink and/or downlink channels), and/or RRC information. At least a portion of the RMSI 408 may be common to UEs operating on the cell.

As described, supra, the MIB 404 may indicate a multiplexing pattern for the SS/PBCH block 410 and the CORESET 412, but may not indicate a position of the downlink data channel 414 within one of the patterns 400, 420, 440. Rather, the position of the downlink data channel 414 within one of the patterns 400, 420, 440 may be signaled through a combination of one or more values in the MIB 404 and one or more values in the DCI 406. For RMSI 408 carried on the downlink data channel 414, the SLIV of the RMSI 408 may be determined through the combination of the one or more values in the MIB 404 and the one or more values in the DCI 406.

Illustratively, at least one of a plurality of patterns 400, 420, 440 for transmission of the SS/PBCH block 410, the CORESET 412, and the downlink data channel 414 may be signaled to a UE. With respect to the first pattern 400, the SS/PBCH block 410 may be transmitted in a first set of symbols (e.g., a first slot) on a first bandwidth part (e.g., a first set of subcarriers). The CORESET 412 and the downlink data channel 414 may be transmitted at a second set of symbols different from the first set of symbols—e.g., the CORESET 412 and the downlink data channel 414 may be transmitted in a second slot, such as a next consecutive slot after the first slot. The CORESET 412 and the downlink data channel 414 may be time-division multiplexed. The CORESET 412 and the downlink data channel 414 may be transmitted on a second bandwidth part (e.g., a second set of subcarriers) that at least partially overlaps with the first bandwidth part.

Referring to the second pattern 420, the SS/PBCH block 410 may be transmitted in a first set of symbols (e.g., a first slot) on a first bandwidth part (e.g., a first set of subcarriers). The CORESET 412 may be transmitted in the first set of symbols (e.g., the first slot) on a second bandwidth part (e.g., a second set of subcarriers) that may be different from the first bandwidth part. That is, the SS/PBCH block 410 and the CORESET 412 may be frequency-division multiplexed. The downlink data channel 414 may be transmitted on the second bandwidth part (e.g., the second set of subcarriers), but at a different time than the CORESET 412. For example, the downlink data channel 414 may be transmitted on a second set of symbols that is different from the first set of symbols.

With reference to the third pattern 440, the SS/PBCH block 410 may be transmitted in a first set of symbols (e.g., a first slot) on a first bandwidth part (e.g., a first set of subcarriers). The CORESET 412 may be transmitted in a second set of symbols that at least partially overlaps with the first set of symbols. The CORESET 412, however, may be transmitted on a second bandwidth part (e.g., a second set of subcarriers) that is different from the first bandwidth part. Similarly, the downlink data channel 414 may be transmitted in a third set of symbols that at least partially overlaps with the first set of symbols but is different from the second set of symbols. The downlink data channel 414 also may be transmitted on the second bandwidth part that is different from the first bandwidth part. Thus, the SS/PBCH block 410 may be frequency-division multiplexed with the CORESET 412 and the downlink data channel 414, while the CORESET 412 and the downlink data channel 414 may be time-division multiplexed.

In view of the plurality of patterns 400, 420, 440 according to which the downlink data channel 414 may be transmitted, a UE may be provided with information indicating the position of the downlink data channel 414. In particular, a UE may be determine a SLIV associated with the RMSI 408. Explicitly signaling all patterns 400, 420, 440 to a UE may be impractical within the payload of the DCI 406. Thus, FIGS. 5-11 may illustrate operations for providing a UE with information from which the position of the downlink data channel 414 may be determined based on at least in part on implicit signaling.

By way of illustration, Table 1 through Table 5 illustrate the correspondence between a multiplexing pattern and a set of resource blocks and slot symbols of a CORESET for a control channel search space (e.g., PDCCH, such as a Type0-PDCCH search space). Table 1 through Table 5 are presented by way of illustration, and the multiplexing pattern does not necessarily correspond to one of the patterns 400, 420, 440. Referring to Table 1, the subcarrier spacing of the SS/PBCH block 410 may be 120 kHz and the subcarrier spacing of the control channel (e.g., PDCCH) in which the CORESET 412 may be located may be 120 kHz. Referring to Table 2, the subcarrier spacing of the SS/PBCH block 410 may be 240 kHz and the subcarrier spacing of the control channel (e.g., PDCCH) in which the CORESET 412 may be located may be 120 kHz.

TABLE 1

| Index | SS/PBCH block and control resource set multiplexing pattern | Number of RBs $N_{RB}^{CORESET}$ | Number of Symbols $N_{symb}^{CORESET}$ | Offset (RBs) |
| --- | --- | --- | --- | --- |
| 0 | 1 | 24 | 2 | 0 |
| 1 | 1 | 24 | 2 | 4 |
| 2 | 1 | 48 | 1 | 14 |
| 3 | 1 | 48 | 2 | 14 |
| 4 | 3 | 24 | 2 | −20 if $k_{SSB} = 0$ −21 if $k_{SSB} > 0$ |
| 5 | 3 | 24 | 2 | 24 |
| 6 | 3 | 48 | 2 | −20 if $k_{SSB} = 0$ −21 if $k_{SSB} > 0$ |
| 7 | 3 | 48 | 2 | 48 |
| 8 | Reserved | | | |
| 9 | Reserved | | | |

TABLE 1-continued

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 10 | Reserved | | | |
| 11 | Reserved | | | |
| 12 | Reserved | | | |
| 13 | Reserved | | | |
| 14 | Reserved | | | |
| 15 | Reserved | | | |

TABLE 2

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 48 | 1 | 0 |
| 1 | 1 | 48 | 1 | 8 |
| 2 | 1 | 48 | 2 | 0 |
| 3 | 1 | 48 | 2 | 8 |
| 4 | 2 | 24 | 1 | −41 if $k_{SSB} = 0$ <br> −42 if $k_{SSB} > 0$ |
| 5 | 2 | 24 | 1 | 25 |
| 6 | 2 | 48 | 1 | −41 if $k_{SSB} = 0$ <br> −42 if $k_{SSB} > 0$ |
| 7 | 2 | 48 | 1 | 49 |
| 8 | Reserved | | | |
| 9 | Reserved | | | |
| 10 | Reserved | | | |
| 11 | Reserved | | | |
| 12 | Reserved | | | |
| 13 | Reserved | | | |
| 14 | Reserved | | | |
| 15 | Reserved | | | |

TABLE 3

| Index | O | Number of search space sets per slot | M | First symbol index |
|---|---|---|---|---|
| 0 | 0 | 1 | 1 | 0 |
| 1 | 0 | 2 | ½ | {0, if i is even}, {7, if i is odd} |
| 2 | 2.5 | 1 | 1 | 0 |
| 3 | 2.5 | 2 | ½ | {0, if i is even}, {7, if i is odd} |
| 4 | 5 | 1 | 1 | 0 |
| 5 | 5 | 2 | ½ | {0, if i is even}, {7, if i is odd} |
| 6 | 0 | 2 | ½ | {0, if i is even}, {$N_{symb}^{CORESET}$, if i is odd} |
| 7 | 2.5 | 2 | ½ | {0, if i is even}, {$N_{symb}^{CORESET}$, if i is odd} |
| 8 | 5 | 2 | ½ | {0, if i is even}, {$N_{symb}^{CORESET}$, if i is odd} |
| 9 | 7.5 | 1 | 1 | 0 |
| 10 | 7.5 | 2 | ½ | {0, if i is even}, {7, if i is odd} |
| 11 | 7.5 | 2 | ½ | {0, if i is even}, {$N_{symb}^{CORESET}$, if i is odd} |
| 12 | 0 | 1 | 2 | 0 |
| 13 | 5 | 1 | 2 | 0 |
| 14 | Reserved | | | |
| 15 | Reserved | | | |

TABLE 4

| Index | PDCCH monitoring occasions (SFN and slot number) | First symbol index (k = 0, 1, ..., 7) |
|---|---|---|
| 0 | $SFN_C = SFN_{SSB,i}$ <br> $n_C = n_{SSB,i}$ or $n_C = n_{SSB,i} − 1$ | 0, 1, 2, 3, 0, 1 in i = 8k, i = 8k + 1, i = 8k + 2, i = 8k + 3, i = 8k + 6, i = 8k + 7 ($n_c = n_{SSB,i}$) <br> 12, 13 in i = 8k + 4, i = 8k + 5 ($n_C = n_{SSB,i} − 1$) |
| 1 | Reserved | |
| 2 | Reserved | |
| 3 | Reserved | |
| 4 | Reserved | |
| 5 | Reserved | |
| 6 | Reserved | |
| 7 | Reserved | |
| 8 | Reserved | |
| 9 | Reserved | |
| 10 | Reserved | |
| 11 | Reserved | |
| 12 | Reserved | |
| 13 | Reserved | |
| 14 | Reserved | |
| 15 | Reserved | |

Referring to Table 3, a set of parameters for monitoring occasions of a control channel (e.g., PDCCH) are illustrated. The set of parameters may be associated with a common search space (e.g., Type0-PDCCH common search space), and may be associated the SS/PBCH block 410 with a multiplexing pattern 1 (e.g., a first of the patterns 400, 420, 440) for the CORESET 412 and a frequency range 2. Referring to Table 4, monitoring occasions of a control channel (e.g., PDCCH) for a common search space (e.g., Type0-PDCCH common search space) are illustrated. The monitoring occasions of Table 4 may be associated with a multiplexing pattern 2 (e.g., a second of the patterns 400, 420, 440) of the SS/PBCH block 410 and the CORESET 412 when the subcarrier spacing of the SS/PBCH block 410 is 240 kHz and the subcarrier spacing of the control channel in which the CORESET 412 may be found is 120 kHz. Referring to Table 5, monitoring occasions of a control channel (e.g., PDCCH) for a common search space (e.g., Type0-PDCCH common search space) are illustrated. The monitoring occasions of Table 5 may be associated with a multiplexing pattern 3 (e.g., a third of the patterns 400, 420, 440) of the SS/PBCH block 410 and the CORESET 412 when the subcarrier spacing of the SS/PBCH block 410 is 120 kHz and the subcarrier spacing of the control channel in which the CORESET 412 may be found is 120 kHz.

TABLE 5

| Index | PDCCH monitoring occasions (SFN and slot number) | First symbol index (k = 0, 1, ... 15) |
|---|---|---|
| 0 | $SFN_c = SFN_{SSB,i}$ <br> $n_C = n_{SSB,i}$ | 4, 8, 2, 6 in i = 4k, i = 4k + 1, i = 4k + 2, i = 4k + 3 |
| 1 | Reserved | |
| 2 | Reserved | |
| 3 | Reserved | |
| 4 | Reserved | |
| 5 | Reserved | |
| 6 | Reserved | |
| 7 | Reserved | |
| 8 | Reserved | |
| 9 | Reserved | |
| 10 | Reserved | |
| 11 | Reserved | |
| 12 | Reserved | |

TABLE 5-continued

| Index | PDCCH monitoring occasions (SFN and slot number) | First symbol index (k = 0, 1, . . . 15) |
|---|---|---|
| 13 | Reserved | |
| 14 | Reserved | |
| 15 | Reserved | |

Figure 5:
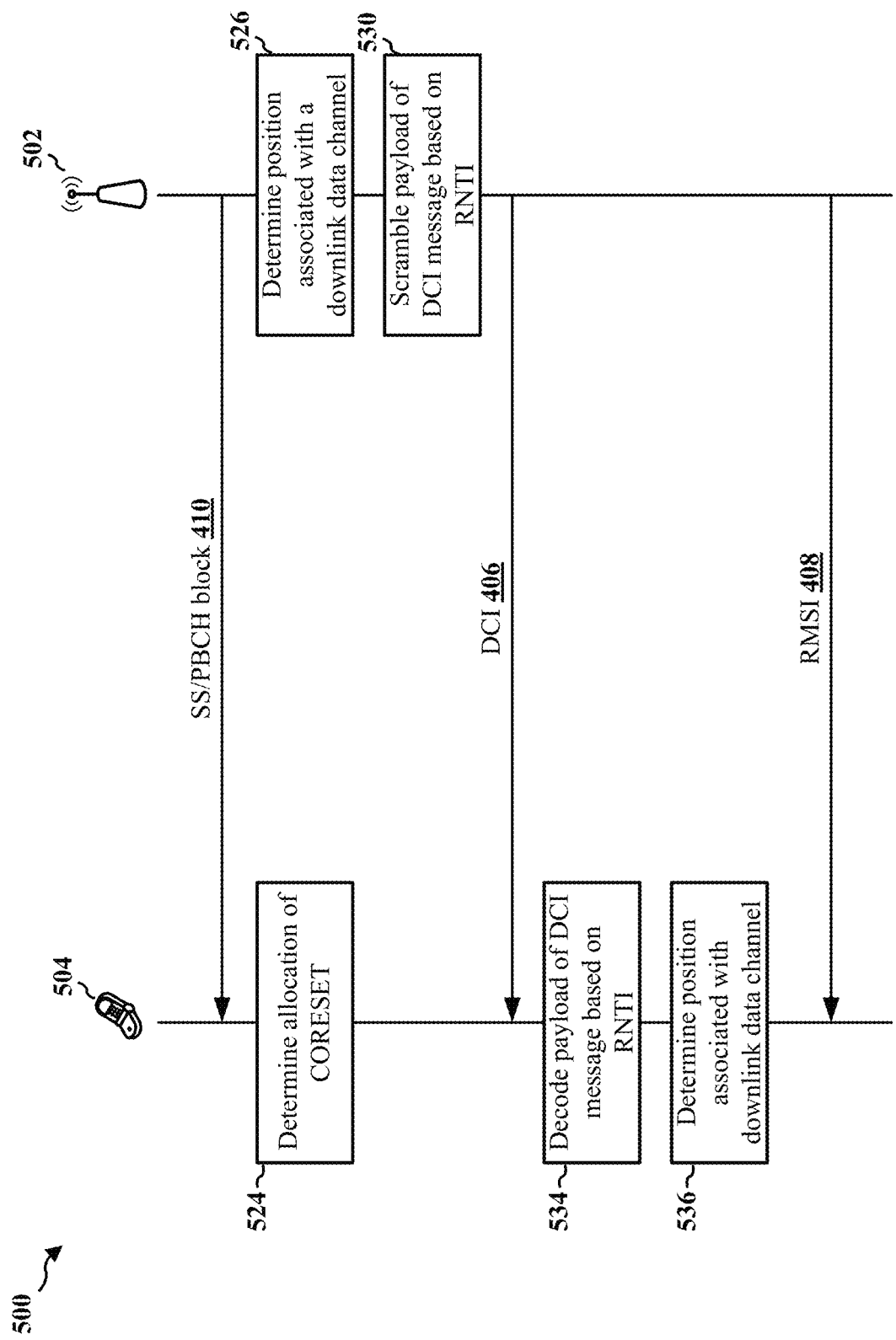
FIG. 5 is a call flow diagram illustrating a wireless communications system.

FIG. 5 illustrates a call flow diagram of a wireless communications system 500 in which a position of a downlink data channel may be determined based on at least one value indicated by an SS/PBCH block and based on at least one value indicated by RMSI configuration information. The wireless communications system 500 may include a base station 502 (e.g., a gNB) and a UE 504, which may be configured to communicate in a RAN according to one or more standards defined for the RAN (e.g., one or more 3GPP standards defined for 5G NR).

In the illustrated aspect, the base station 502 may be configured to send an SS/PBCH block 410. For example, the base station 502 may periodically broadcast a plurality of SS/PBCH blocks in a plurality of different directions—e.g., during a first period, the base station 502 may broadcast the SS/PBCH block 410 on a first directional beam and may broadcast another SS/PBCH block on a second directional beam.

As described with respect to FIG. 4, the SS/PBCH block 410 may include an MIB 404. For example, the MIB 404 may indicate one or more of an SFN, a subcarrier spacing (e.g., for a SIB1, for RMSI, and/or for one or more RACH messages), a subcarrier offset (e.g., a frequency domain offset between the SS/PBCH block 410 and an overall resource block grid), and/or a position of a downlink DM-RS (e.g., a first downlink DM-RS).

In addition, the MIB 404 may indicate an allocation of a CORESET 412. For example, the MIB 404 may include a first field having a plurality of bits (e.g., eight bits). An example of the first field may be a pdcch-ConfigSIB1 field. A first set of bits of the first field may be a set of most significant bits (e.g., the first four bits of the first field), and a second set of bits of the first field may be a set of least significant bits (e.g., the next four bits of the first field). The set of most significant bits of the first field may define the CORESET 412, and the set of least significant bits of the first field may determine a monitoring occasion of a PDCCH in the CORESET 412.

The UE 504 may determine 524 an allocation of the CORESET 412 based on the most significant bits of the first field. In one aspect, the UE may determine, based on the most significant bits, a multiplexing pattern (e.g., one of patterns 400, 420, 440) for at least the SS/PBCH block 410 and the CORESET 412, a number of resource blocks of the CORESET 412, a number of symbols of the CORESET 412, and an offset value of a number of resource blocks that the CORESET 412 is offset from the SS/PBCH block 410.

Further, the UE 504 may determine a monitoring occasion of the PDCCH in the CORESET 412 based on the least significant bits of the first field. In one aspect, the UE 504 may determine, based on the least significant bits of the first field, a number of search space sets per slot to be monitored, a first symbol index to be monitored for a search space set, and a first slot index to be monitored for a search space set. When the UE 504 determines 524 the allocation, the UE 504 may monitor the determined allocation in order to receive PDCCH in the CORESET 412.

In addition to the MIB 404 carried on the PBCH, the base station 502 may send system information associated with a cell provided by the base station 502. The system information may be RMSI 408, which may include at least a portion of system information associated with a SIB1. When the base station 502 is to send the RMSI 408, the base station 502 may determine 526 a position associated with the downlink data channel 414 on which the RMSI 408 is carried.

In some aspects, the base station 502 may schedule the RMSI 408 on the downlink data channel 414 in at least one slot allocated for the downlink data channel 414. The base station 502 may schedule the RMSI 408 in the at least one slot of the downlink data channel 414 based on a slot in which the DCI 406 occurs, the subcarrier spacing of a control channel (e.g., PDCCH), the subcarrier spacing of the downlink data channel 414 (e.g., PDSCH), and the numerology of the downlink data channel 414. Accordingly, the at least one slot of the downlink data channel 414 may be offset from a slot that includes the DCI 406. The base station 502 may indicate the at least one slot allocated for the downlink data channel 414 in an RRC parameter and/or a field of the DCI 406 (e.g., a time domain resource allocation field). Within the slot allocated for the downlink data channel 414, the base station 502 may schedule the RMSI 408 at a starting symbol and occurring over a number of consecutive symbols (i.e., length) on the downlink data channel 414.

In some aspects, the base station 502 may determine a SLIV that indicates the starting symbol and allocated number of consecutive symbols for the RMSI 408. The SLIV may be a function of the starting symbol and the length (i.e., allocated number of symbols) of the RMSI 408. For example, the SLIV may be a function according to Equation 1, infra.

$$SLIV = \begin{cases} 14 \times (\text{Length} - 1) + \text{Starting Symbol}, & (\text{Length} - 1) \leq 7 \\ 14 \times (14 - \text{Length} + 1) + (14 - 1 - \text{Starting Symbol}), & (\text{Length} - 1) < 7 \end{cases} \quad \text{Equation 1}$$

where $0 < L \leq 14 - \text{Starting Symbol}$

When the base station 502 determines 526 the position associated with the downlink data channel 414, the base station 502 may indicate the position to the UE 504, e.g., in order to adhere to one or more standards defining operation in the RAN in which the UE 504 and the base station 502 communicate. For example, the base station 502 may indicate the position associated with the downlink data channel 414 using at least a starting symbol and an allocated number of consecutive symbols of the RMSI 408 on the downlink data channel 414. Additionally or alternatively, the base station 502 may indicate the position associated with the downlink data channel 414 using at least an SLIV that is based on the starting symbol and an allocated number of consecutive symbols of the RMSI 408 on the downlink data channel 414 (e.g., as defined in Equation 1).

The base station 502 may indicate the position associated with the downlink data channel 414 using DCI. However, the payload capacity of DCI (e.g., DCI of Format 1_0) for scheduling a PDSCH in a cell may be insufficient to unambiguously convey the position associated with the downlink data channel 414. Thus, in some aspects, a combination of at least one value associated with the SS/PBCH block 410 and at least one value of DCI 406 may be used to convey the position associated with the downlink data channel 414.

A table (e.g., lookup table) may include a set of entries, and each entry may indicate a correspondence between a position associated with the downlink data channel 414 and a combination of at least one value associated with the SS/PBCH block 410 and at least one value of a DCI 406. An example of a table is illustrated at Table 6, infra. Table 6 is to be regarded as illustrative, and the correspondence between a combination of the first value and the second value may correspond with different starting symbols, different lengths, and/or different SLIVs according to different aspects.

TABLE 6

| First Value (SS/PBCH) | Second Value (DCI) | Starting Symbol | Length (in symbols) | SLIV |
|---|---|---|---|---|
| 0 | 0000 | 0 | 1 | 0 |
| 1 | 0000 | 0 | 2 | 14 |
| 2 | 0000 | 0 | 3 | 28 |
| ... | | | | |
| 0 | 0001 | 1 | 1 | 1 |
| 1 | 0001 | 1 | 2 | 15 |

In various other aspects, a set of values may indicate a resource allocation to apply in order to determine a position of the downlink data channel 414. The set of values may include other values in addition to the aforementioned first value (e.g., the first value indicated by the SS/PBCH block 410) and second value (e.g., the second value indicated by the DCI 406). One or more of Tables 7 through 11, infra, may illustrate correspondence between a set of values and a time/frequency resource allocation of a downlink data channel 414, such as a PDSCH.

For example, Table 7 illustrates a set of values that may index a table for determining a position of a downlink data channel 414. The set of values may include an RNTI, a type of control channel (e.g., PDCCH) search space, a multiplexing pattern (e.g., an SS/PBCH block and CORESET multiplexing pattern), whether one field (e.g., pdsch-ConfigCommon) of an information element includes another field (e.g., pdsch-TimeDomainAllocationList) of an information element, and/or whether a different field (e.g., pdsch-Config) of an information element includes the other field (e.g., pdsch-TimeDomainAllocationList) of an information element. In the example of Table 7, the position of the downlink data channel 414 (in this example, the position being a PDSCH time domain resource allocation to apply) may correspond to either an allocation configuration (e.g., a PDSCH time domain allocation A, B, or C according to one of Tables 8 through 11) or an allocation configuration defined by a higher layer configuration (e.g., an allocation configuration indicated in a field of an information element received from the base station 502, such as a pdsch-TimeDomainAllocationList field indicated in either a pdsch-ConfigCommon information element or a pdsch-Config information element).

Referring to Tables 8 through 11, a PDSCH time domain resource allocation may be an aspect of a position of the downlink data channel 414. The UE 504 may determine the PDSCH time domain resource allocation to apply according to Table 7, such as Default A, Default B, or Default C. When the UE 504 is using normal CP and the set of values corresponds to "Default A," the UE 504 may refer to Table 8 in order to determine the PDSCH time domain resource allocation. When the UE 504 is using extended CP and the set of values corresponds to "Default A," the UE 504 may refer to Table 9 in order to determine the PDSCH time domain resource allocation. When the UE 504 determines the set of values corresponds to "Default B," the UE 504 may refer to Table 10 in order to determine the PDSCH time domain resource allocation. When the UE 504 determines the set of values corresponds to "Default C," the UE 504 may refer to Table 11 in order to determine the PDSCH time domain resource allocation. When the UE 504 determines that the set of values corresponds to none of "Default A," "Default B," and "Default C," the UE 504 may determine the PDSCH time domain resource allocation based on a field (e.g., pdsch-TimeDomainAllocationList) of an information element (e.g., pdsch-Config or pdsch-ConfigCommon), as indicated in Table 7.

Tables 8-11 may include a set of PDSCH time domain resource allocations from which the UE 504 may determine one PDSCH time domain resource allocation to be applied to receive a PDSCH (e.g., downlink data channel 414). In order to determine the row index corresponding to the PDSCH time domain resource allocation to apply, the UE 504 may identify a value m from a "Time domain resource assignment" field of DCI (e.g., DCI 406), and the UE 504 may calculate the row index as equal to m+1. Further, the UE 504 may determine the dmrs-TypeA-Position from a field of the MIB 404. Further, the UE 504 may determine the PDSCH mapping type from a field of an information element, such as a mappingType field of a PDSCH-TimeDomainResourceAllocationList information element, which may be received from the base station 502 (e.g., in the DCI 406).

The PDSCH time domain resource allocation may be indicated as a SLIV or may be indicated as a plurality of values associated with a SLIV. In Table 8, the PDSCH time domain resource allocation may be indicated as $K_0$, S, and L. $K_0$ indicates a slot offset to the slot allocated for the PDSCH, S indicates a starting symbol relative to the start of a slot allocated for the PDSCH, and L indicates the number of consecutive symbols counting from the symbol S allocated for the PDSCH. The UE 504 may calculate the slot allocated for the PDSCH based on $K_0$ using the following Equation 2:

$$\text{Slot allocated for } PDSCH = \left\lfloor n \cdot \frac{2^{\mu_{PDSCH}}}{2^{\mu_{PDCCH}}} \right\rfloor + K_0, \quad \text{Equation 2}$$

where n is the slot with the scheduling DCI (e.g., DCI 406), $K_0$ is based on the numerology of the PDSCH, and $\mu_{PDSCH}$ and $\mu_{PDCCH}$ are the subcarrier spacing configurations for the PDSCH and PDCCH, respectively.

TABLE 7

| RNTI | PDCCH search space | SS/PBCH block and CORESET multiplexing pattern | pdsch-ConfigCommon includes pdsch-TimeDomainAllocationList | pdsch-Config includes pdsch-TimeDomainAllocationList | PDSCH time domain resource allocation to apply |
|---|---|---|---|---|---|
| SI-RNTI | Type0 common | 1 | — | — | Default A for normal CP |
| | | 2 | — | — | Default B |
| | | 3 | — | — | Default C |
| SI-RNTI | Type0A common | 1 | No | — | Default A |
| | | 2 | No | — | Default B |
| | | 3 | No | — | Default C |
| | | 1, 2, 3 | Yes | — | pdsch-TimeDomainAllocationList provided in pdsch-ConfigCommon |
| RA-RNTI, TC-RNTI | Type1 common | 1, 2, 3 | No | — | Default A |
| | | 1, 2, 3 | Yes | — | pdsch-TimeDomainAllocationList provided in pdsch-ConfigCommon |
| P-RNTI | Type2 common | 1 | No | — | Default A |
| | | 2 | No | — | Default B |
| | | 3 | No | — | Default C |
| | | 1, 2, 3 | Yes | — | pdsch-TimeDomainAllocationList provided in pdsch-ConfigCommon |
| C-RNTI, MCS-C-RNTI, CS-RNTI | Any common search space associated with CORESET#0 | 1, 2, 3 | No | — | Default A |
| | | 1, 2, 3 | Yes | — | pdsch-TimeDomainAllocationList provided in pdsch-ConfigCommon |
| C-RNTI, MCS-C-RNTI, CS-RNTI | Any common search space not associated with CORESET#0 UE specific search space | 1, 2, 3 | No | No | Default A |
| | | 1, 2, 3 | Yes | No | pdsch-TimeDomainAllocationList provided in pdsch-ConfigCommon |
| | | 1, 2, 3 | No/Yes | Yes | pdsch-TimeDomainAllocationList provided in pdsch-Config |

TABLE 8

| Row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 9

| Row index | dmrs-TypeA-Position | PDSCH mapping type | $K_0$ | S | L |
|---|---|---|---|---|---|
| 1 | 2 | Type A | 0 | 2 | 6 |
| | 3 | Type A | 0 | 3 | 5 |

TABLE 9-continued

| Row index | dmrs-TypeA-Position | PDSCH mapping type | $K_0$ | S | L |
|---|---|---|---|---|---|
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 6 | 4 |
|  | 3 | Type B | 0 | 8 | 2 |
| 7 | 2 | Type B | 0 | 4 | 4 |
|  | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

TABLE 10

| Row index | dmrs-TypeA-Position | PDSCH mapping type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |
| 15 | 2, 3 | Type B | 1 | 2 | 4 |
| 16 |  | Reserved |  |  |  |

(Note 1): If the PDSCH was scheduled with SI-RNTI in PDCCH Type0 common search space, the UE may assume that this PDSCH resource allocation is not applied

TABLE 11

| Row index | dmrs-TypeA-Position | PDSCH mapping type | $K_0$ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 |  | Reserved |  |  |  |
| 7 |  | Reserved |  |  |  |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|  | 3 | Type A | 0 | 3 | 11 |

TABLE 11-continued

| Row index | dmrs-TypeA-Position | PDSCH mapping type | $K_0$ | S | L |
|---|---|---|---|---|---|
| 15 (Note 1) | 2, 3 | Type A | 0 | 0 | 6 |
| 16 (Note 1) | 2, 3 | Type A | 0 | 2 | 6 |

(Note 1):
The UE may assume that this PDSCH resource allocation is not used, if the PDSCH was scheduled with SI-RNTI in PDCCH Type0 common search space In some aspects, the first value may be indicated by the SS/PBCH block 410 (e.g., without considering values indicated by the MIB 404)—e.g., the first value may include a minimum system bandwidth indicated by the SS/PBCH block 410 or an index of the SS/PBCH block 410. In other aspects, the first value may be indicated by the SS/PBCH block 410 through at least one value indicated by the MIB 404—e.g., the first value may include a multiplexing pattern, a symbol index for a search space set, a number of symbols associated with the CORESET 412, or a number of search space sets per slot. The second value may be include a value indicated by the DCI 406. For example, the second value may be a value included in a time domain resource assignment field of the payload of the DCI 406.

The base station 502 may set a field in the payload of the DCI 406 to include the second value so that a combination of the first value (indicated by the SS/PBCH block 410) and the second value (indicated by the DCI 406) correspond with the position associated with the downlink data channel 414. For example, in the context of Table 6, the first value may be a multiplexing pattern indicated by the MIB 404 for the SS/PBCH block 410 and the CORESET 412, and the base station 502 may set the MIB 404 to indicate the multiplexing pattern is one. The base station 502 may further determine 526 the position associated with the downlink data channel 414 has a starting symbol of zero and a length of two consecutive symbols (corresponding to a SLIV of fourteen). Accordingly, the base station 502 may set a field in the payload of the DCI 406 to be a second value of 0000. According to an entry in Table 6, the combination of the first value (e.g., a multiplexing pattern indicated by the MIB 404 set to one) and the second value (e.g., a field in the payload of the DCI 406 set to 0000) may correspond with a position associated with the downlink data channel 414 having a starting symbol of zero and a length of two consecutive symbols (corresponding to a SLIV of fourteen).

In some aspects, the second value may be set based on an RNTI associated with the UE 504. For example, the UE 504 may be associated with a plurality of RNTIs in the wireless communications system 500, and each RNTI may be associated with a different set of operations for the UE 504. Specifically, a C-RNTI may be used for UE-specific transmissions to the UE 504 after the UE 504 has performed a RACH procedure, an RA-RNTI may be used for a random access response (e.g., MSG2) of a RACH procedure with the UE 504, and a TC-RNTI may be used for a contention resolution message (e.g., MSG4) of a RACH procedure with the UE 504. In some aspects, additional RNTIs may be associated with the UE 504, including a SI-RNTI and a P-RNTI.

The base station 502 may scramble 530 the payload of the DCI 406 with one RNTI associated with the UE 504 in order to set the second value so that a combination of the first value (indicated by the SS/PBCH block 410) and the second value (indicated by the DCI 406) correspond with the position associated with the downlink data channel 414. For example, the base station 502 may scramble 530 the payload of the DCI 406 with a specific one of the RNTIs so that the payload of the DCI 406 indicates a second value (in combination with the first value) that corresponds to the determined position associated with the downlink data channel 414 when the payload of the DCI 406 is decoded with the same one of the RNTIs.

The base station 502 may send the DCI 406 in the CORESET 412. Based on the information indicated by the MIB 404 that defines the CORESET 412 and the monitoring occasion of the PDCCH in the CORESET 412, the UE 504 may (blindly) decode PDCCH candidates in the CORESET 412 in order to detect the DCI 406. When the UE 504 finds the DCI 406 in the CORESET 412, the UE 504 may decode 534 the payload of the DCI 406. For example, the UE 504 may decode the payload of the DCI 406 using one RNTI associated with the UE 504, such as a C-RNTI, an RA-RNTI, a TC-RNTI, an SI-RNTI, or a P-RNTI.

The UE 504 may select the RNTI to use for decoding the payload of the DCI 406 based on a status of the UE 504 in the cell provided by the base station 502. For example, if the UE 504 has completed a RACH procedure with the base station 502, the UE 504 may select the C-RNTI. If the UE 504 is performing a RACH procedure with the base station 502 and has received a random access response (e.g., MSG2), the UE 504 may select the RA-RNTI. If the UE 504 is performing a RACH procedure with the base station 502 and has received a contention resolution message (e.g., MSG4), the UE 504 may select the TC-RNTI.

When the UE 504 decodes 534 the payload of the DCI 406, the UE 504 may identify the second value in a field of the decoded payload of the DCI 406, such as a time domain resource assignment field. Further, the UE 504 may determine the first value as indicated by the SS/PBCH block 410. In some aspects, the first value may include one of the minimum system bandwidth or the index of the SS/PBCH block 410 and, therefore, the UE 504 may determine the first value by detecting the minimum system bandwidth based on the SS/PBCH block 410 or by detecting the index of the SS/PBCH block 410, respectively.

In other aspects, the first value may include one of a multiplexing pattern, a symbol index for a search space set, a number of symbols associated with the CORESET 412, or a number of search space sets per slot and, therefore, the UE 504 may determine the first value by identifying a respective one of the multiplexing pattern, the symbol index for the search space set, the number of symbols associated with the CORESET 412, or the number of search space sets per slot based on information included in the MIB 404.

The UE 504 may then determine 536 the position associated with the downlink data channel 414 based on the first value and the second value. In particular, the UE 504 may determine 536 the position associated with the downlink data channel 414 from the combination of the first value and second value.

According to various aspects, the UE 504 may access a table (e.g., lookup table) that is indexed by the combination of the first value and the second value in order to identify an entry indicating the position associated with the downlink data channel 414 that corresponds with both the first value and the second value. As described, supra, Table 6 illustrates an example of a table that may be accessed by the UE 504 and indexed by a first value indicated by the SS/PBCH block 410 and a second value indicated by the DCI 406 and, similarly Tables 7-11 may illustrate examples of tables that may be accessed by the UE 504 and indexed by a set of values. In one aspect, the UE 504 may have the table stored therein before the UE 504 performs initial cell acquisition on a cell provided by the base station 502 (e.g., the table may be preconfigured in the UE 504). In another aspect, the UE 504 may receive the table from the base station 502 (e.g., the UE 504 may receive the table from the base station 502 via RRC signaling).

By way of illustration, the UE 504 may determine a multiplexing pattern for the SS/PBCH block 410 and the CORESET 412 is set to one based on the most significant bits of a field of the MIB 404. Further, the UE 504 may decode the payload of the DCI 406 using an RNTI associated with the UE 504 (e.g., a C-RNTI, an RA-RNTI, a TC-RNTI, etc.), which result in a four-bit value of a field (e.g., a time domain resource assignment field) being equal to 0000. The UE 504 may then access Table 6 with the combination of the first value set to one and the second value set to 0000 as the index, and the index may indicate a starting symbol of zero and a length of two and/or may indicate a SLIV of fourteen (from which the starting symbol of zero and length of two may be determined). Accordingly, the UE 504 may determine 536 the position associated with the downlink data channel 414 beginning at a symbol having an index of zero and continuing through a consecutive symbol to end at a symbol having an index of one (because the length of two may include the starting symbol at index zero).

According to the determined position associated with the downlink data channel 414, the base station 502 may send data on the downlink data channel 414. In particular, the base station 502 may send RMSI 408 on the downlink data channel 414 (e.g., PDSCH) beginning with the starting symbol corresponding to the combination of the first value and the second value and occurring in a set of consecutive symbols equal to the length corresponding to the combination of the first value and the second value. The base station 502 may send the data at the determined position in a slot that is allocated for the downlink data channel 414 and is offset from a slot that includes the DCI 406.

Based on the determination 536 of the position associated with the downlink data channel 414, the UE 504 may detect for and receive data carried on the downlink data channel 414 at the determined position. Specifically, the UE 504 may receive the RMSI 408 carried on the downlink data channel 414 beginning with a starting symbol determined from the combination of the first value and the second value and occurring in a set of consecutive symbols equal to the length corresponding to the combination of the first value and the second value. The UE 504 may detect the RMSI 408 in a set of symbols corresponding to the symbol indexes of the starting symbol and the consecutive symbols following the starting symbol with respect to a slot allocated for the downlink data channel 414. The slot allocated for the downlink data channel 414 may be offset from the slot in which the DCI 406 occurs, and the UE 504 may receive the offset in an RRC parameter and/or payload of the DCI 406 (e.g., the offset may be indicated in a field associated with a time domain resource assignment).

From the RMSI 408, the UE 504 may acquire system information associated with the cell provided by the base station 502. In one aspect, the system information may include at least a portion of information carried in a SIB1. In another aspect, the system information may include access permission for the cell provided by the base station 502, scheduling-related system information (e.g., information for one or more uplink and/or downlink channels communicated in the cell), and/or RRC information. At least a portion of the RMSI 408 may be common to UEs operating on the cell provided by the base station 502.

Figure 6:
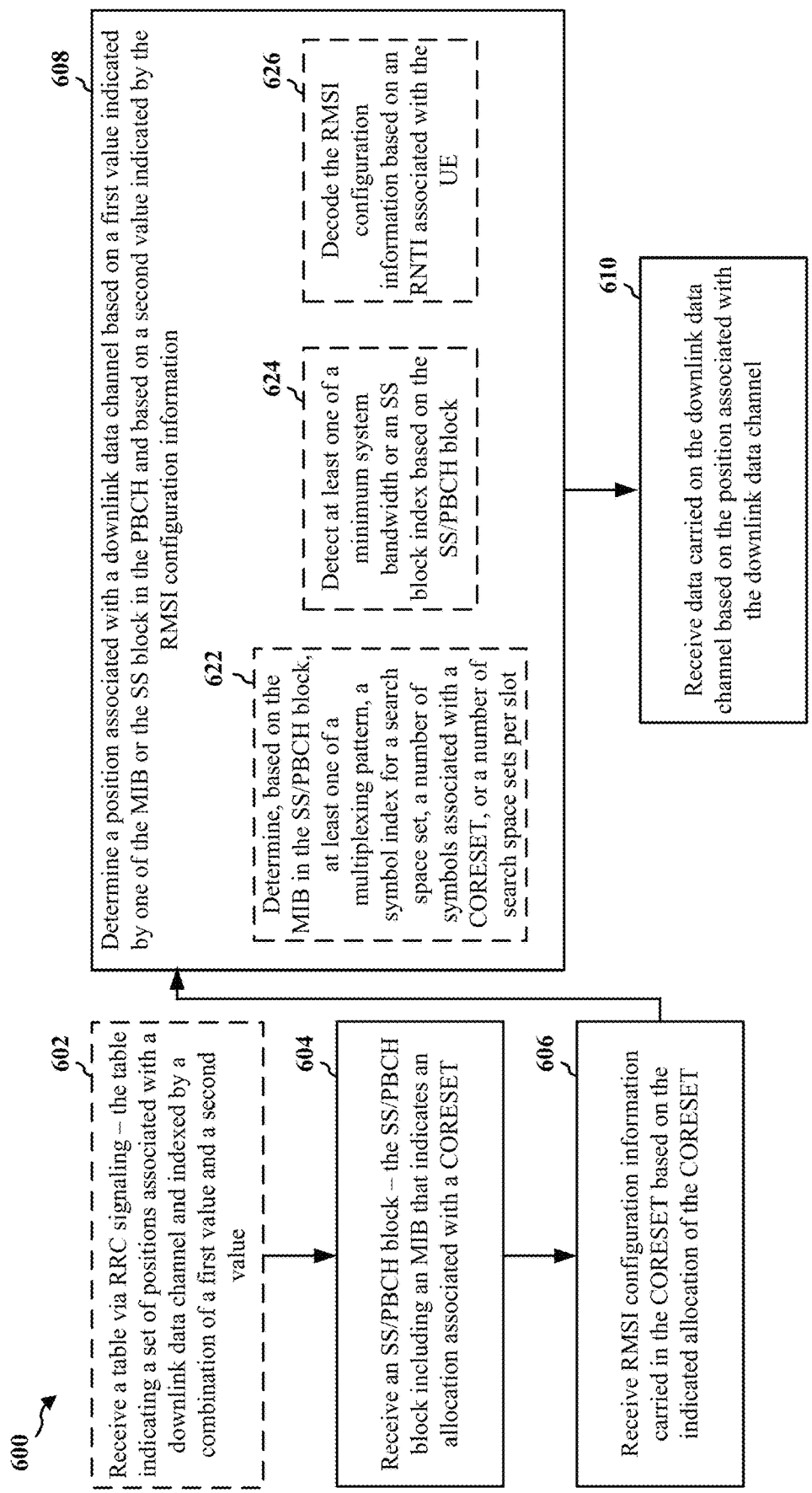
FIG. 6 is a flowchart of a method of wireless communication.

FIG. 6 is a flow diagram illustrating a method 600 of determining a position of a downlink data channel based on information indicated by an SS/PBCH block and based on information indicated by DCI (e.g., DCI of Format 1_0). The method 600 may be performed by a UE and/or apparatus, such as the UE 104 of FIG. 1, the UE 350 of FIG. 3, the UE 504 of FIG. 5, and/or the apparatus 802/802' of FIGS. 8 and 9. In some aspects, one or more of the operations of the method 600 may be transposed, omitted, and/or contemporaneously performed.

Beginning first with operation 602, the UE may receive a table (e.g., a lookup table) via RRC signaling. The table may include a set of positions associated with a downlink data channel and indexed by a combination of a first value indicated by an SS/PBCH block and a second value indicated by DCI (e.g., DCI of Format 1_0). In the context of FIGS. 4-5, the UE 504 may receive, from the base station 502 via RRC signaling, a table that includes an entry indicating a position associated with the downlink data channel 414, and the entry may be indexed by a combination of a first value indicated by the SS/PBCH block 410 and a second value indicated by the DCI 406.

At operation 604, the UE may receive an MIB and an SS block in a PBCH (e.g., SS/PBCH block). The SS/PBCH block may include an MIB that indicates an allocation associated with a CORESET. In the context of FIGS. 4-5, the UE 504 may receive, from the base station 502, the SS/PBCH block 410, which may include the MIB 404 in the PBCH.

At operation 606, the UE may receive RMSI configuration information carried in the CORESET based on the allocation associated with the CORESET. For example, the UE may monitor a set of resources based on the allocation associated with the CORESET indicated by the MIB, and the UE may (blindly) decode one or more PDCCH candidates to find DCI. The RMSI configuration information may be included in a payload of the DCI. In the context of FIGS. 4-5, the UE 504 may determine 524 an allocation associated with the CORESET 412 based on the MIB 404. Then, the UE 504 may receive, from the base station 502, the DCI 406 that is carried in the CORESET 412.

At operation 608, the UE may determine a position associated with a downlink data channel based on a first value indicated by one of the MIB or the SS block in the PBCH and based on a second value indicated by the RMSI configuration information. For example, UE may identify a first value indicated by the MIB and/or the SS block in the PBCH, and the first value may be at least one of a multiplexing pattern, a symbol index for a search space set, a number of symbols associated with the CORESET, a number of search space sets per slot, a minimum system bandwidth, or an index of an SS block. In addition, the UE may identify a second value indicated by the RMSI configuration information, and the second value may be included in a field (e.g., a time domain resource assignment field) of the payload of DCI (e.g., the RMSI configuration information may be at least a portion of the payload of DCI, such as DCI of Format 1_0).

In some aspects, the UE may access a table that indicates a set of positions associated with the downlink data channel, and the table may be indexed by a combination of the first value indicated by the one of the MIB or the SS block in the PBCH and the second value indicated by the RMSI configuration information. Next, the UE may identify a position indicated in the table that corresponds with the combination of the first value indicated by the one of the MIB or the SS block in the PBCH and the second value indicated by the RMSI configuration information. The determined position may be at least one of a starting symbol of data carried on the downlink data channel, a number of consecutive symbols (e.g., length) of the data carried on the downlink data channel, and/or a SLIV associated with the data carried on the downlink data channel.

In the context of FIGS. 4-5, the UE 504 may determine 536 a position associated with the downlink data channel 414. The UE 504 may determine 536 the position associated with the downlink data channel 414 based on the first value indicated by the SS/PBCH block 410 and based on the second value indicated by the DCI 406.

At operation 610, the UE may receive data carried on the downlink data channel based on the position associated with the downlink data channel. For example, the UE may monitor resources at the determined position (e.g., beginning with a starting symbol) and decode data carried on the downlink data channel (e.g., ending with a symbol indicated by the length) to receive the data on the downlink data channel. In one aspect, the downlink data channel may be a PDSCH, and the data carried on the downlink data channel may include RMSI. In the context of FIGS. 4-5, the UE 504 may receive the RMSI 408 carried on the downlink data channel 414 based on the position determined from the first value indicated by the SS/PBCH block 410 and based on the second value indicated by the DCI 406.

With respect to aforementioned operation 608, at which a UE may determine a position associated with a downlink data channel based on the first value indicated by the one of the MIB or the SS block in the PBCH and based on the second value indicated by the RMSI configuration information, one or more of operation 622, operation 624, and/or operation 626 may be performed (e.g., optionally performed).

In one aspect, operation 608 may include operation 622. At operation 622, the UE may determine, based on the MIB in the PBCH, at least one of a multiplexing pattern, a symbol index for a search space set, a number of symbols associated with a CORESET, or a number of search space sets per slot. For example, the UE may identify a set of most significant bits and/or a set of least significant bits included in a field of the MIB. One of the most significant bits or a set of least significant bits may provide at least a portion of an index to a predefined table, and the UE may identify the at least one of the multiplexing pattern, the symbol index for a search space set, the number of symbols associated with the CORESET, or the number of search space sets per slot that corresponds with the one of the most significant bits or a set of least significant bits that indexes the predefined table. The first value indicated by the SS/PBCH block may be based on at least one of the multiplexing pattern, the symbol index for a search space set, the number of symbols associated with the CORESET, or the number of search space sets per slot indicated by the MIB 404 included in the SS/PBCH block 410. In the context of FIGS. 4-5, the UE 504 may determine, based on the MIB 404 included in the SS/PBCH block 410, at least one of a multiplexing pattern, a symbol index for a search space set, a number of symbols associated with a CORESET, or a number of search space sets per slot.

In one aspect, operation 608 includes operation 624. At operation 624, the UE may detect at least one of a minimum system bandwidth or an SS block index based on the one of the MIB or the SS block in the PBCH. For example, the UE may detect the bandwidth of PSS, SSS, and PBCH transmission, and the UE may determine that the minimum system bandwidth corresponds with the detected bandwidth of the PSS, SSS, and PBCH transmission. In another example, the UE may determine a first value indicated in the payload of an SS/PBCH block and a second value indicated by a DM-RS associated with the SS/PBCH block, and the UE may determine the index of the SS block based on the first value indicated in the payload of the SS/PBCH block and the second value indicated by a DM-RS associated with the SS/PBCH block. The first value indicated by the SS/PBCH block may be based on the minimum system bandwidth or the index of the SS block. In the context of FIGS. 4-5, the UE 504 may detect a least one of a minimum system bandwidth or an index of the SS/PBCH block 410 based on the SS/PBCH block 410.

In one aspect, operation 608 includes operation 626. At operation 626, the UE may decode the RMSI configuration information based on an RNTI associated with the UE. For example, the UE may identify a payload of DCI (e.g., DCI of Format 1_0), and the UE may decode the payload using the RNTI. The RNTI may be one of a C-RNTI, a TC-RNTI, an RA-RNTI, an SI-RNTI, or a P-RNTI. The RMSI configuration information may indicate different values depending on the RNTI used to decode the RMSI configuration information. The second value may be based on the decoded RMSI configuration information (e.g., the second value may be equal to the decoded RMSI configuration information). In the context of FIGS. 4-5, the UE 504 may decode 534 the payload of the DCI 406, and the second value may be based on the decoded payload.

Figure 7:
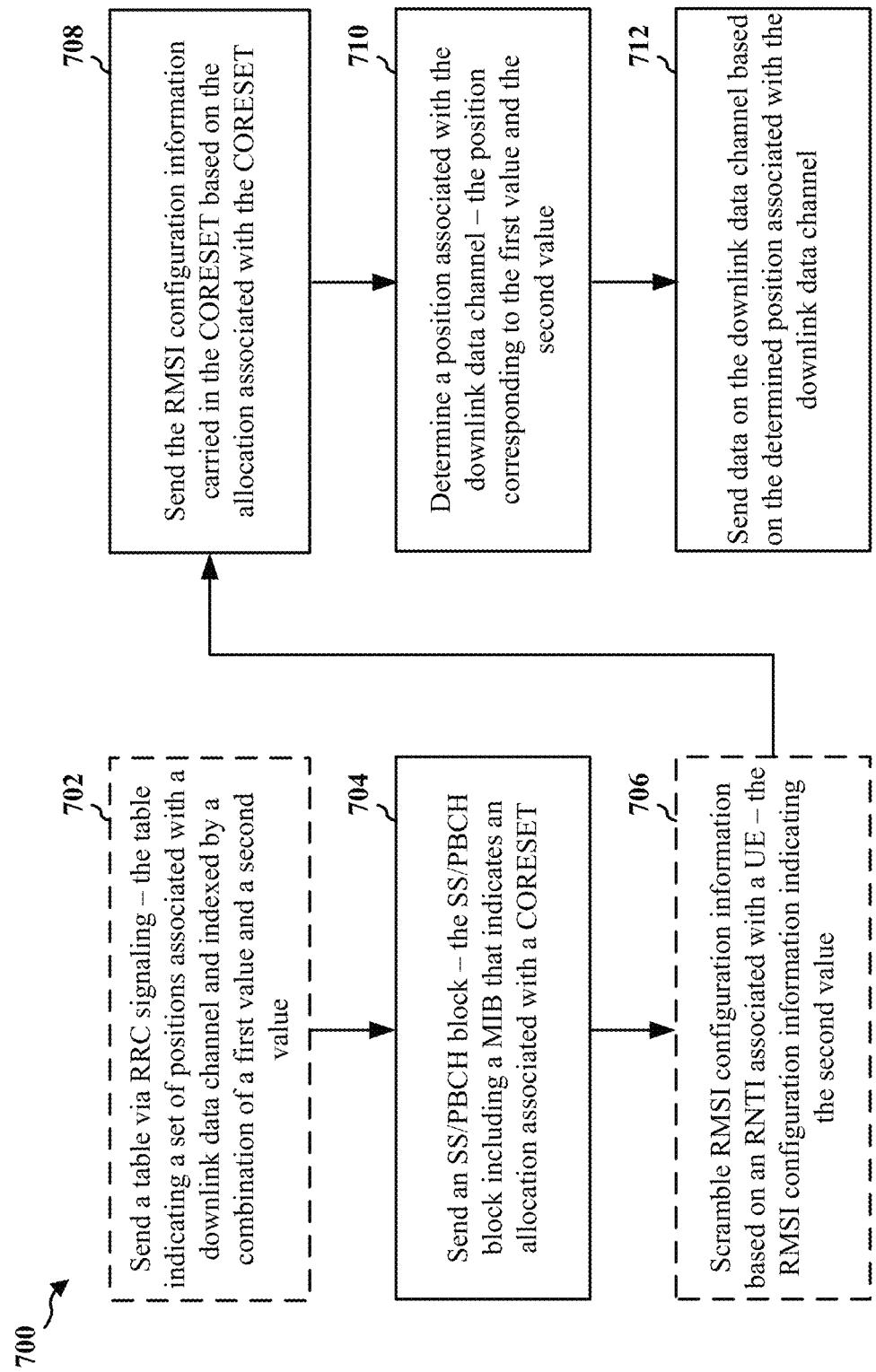
FIG. 7 is a flowchart of a method of wireless communication.

FIG. 7 is a flow diagram illustrating a method 700 of indicating a position of a downlink data channel based on an SS/PBCH block and based on DCI (e.g., DCI of Format 1_0). The method 700 may be performed by a base station and/or apparatus, such as the base station 102/180 of FIG. 1, the base station 310 of FIG. 3, the base station 502 of FIG. 5, and/or the apparatus 1002/1002' of FIGS. 10 and 11. In some aspects, one or more of the operations of the method 600 may be transposed, omitted, and/or contemporaneously performed.

At operation 702, the base station may send a table (e.g., a lookup table) via RRC signaling. The table may include a set of positions associated with a downlink data channel and indexed by a combination of a first value indicated by an SS/PBCH block and a second value indicated by DCI (e.g., DCI of Format 1_0). In the context of FIGS. 4-5, the base station 502 may send, to the UE 504 via RRC signaling, a table that includes an entry indicating a position associated with the downlink data channel 414, and the entry may be indexed by a combination of a first value indicated by the SS/PBCH block 410 and a second value indicated by the DCI 406.

At operation 704, the base station may send an MIB and an SS block in a PBCH. The MIB may indicate an allocation associated with a CORESET. In the context of FIGS. 4-5, the base station 502 may send (e.g., broadcast) the SS/PBCH block 410.

At operation 706, the base station may scramble RMSI configuration information based on an RNTI associated with a UE. For example, the base station may select one of a plurality of RNTIs associated with a UE, and the base station may scramble the payload of DCI (e.g., DCI of Format 1_0) using the selected RNTI so that the payload indicates a value corresponding to a position associated with a downlink data channel when the payload is decoded with the same RNTI. The RNTI may be one of a C-RNTI, a TC-RNTI, an RA-RNTI, an SI-RNTI, or a P-RNTI. In the context of FIGS. 4-5, the base station 502 may scramble 530 the payload of the DCI 406 using an RNTI associated with the UE 504 so that the decoded payload of the DCI 406 indicates a second value that partially indexes a table indicating a position associated with the downlink data channel 414.

At operation 708, the base station may send the RMSI configuration information carried in the CORESET based on the allocation associated with the CORESET. The RMSI configuration information may be included in a payload of the DCI. In the context of FIGS. 4-5, the base station 502 may send the DCI 406 that is carried in the CORESET 412.

At operation 710, the base station may determine a position associated with the downlink data channel. The position may correspond with a first value indicated by one of the MIB or the SS block in the PBCH and a second value indicated by the RMSI configuration information. For example, the base station may determine at least one slot of the downlink data channel based on a slot in which DCI (e.g., DCI of Format 1_0) occurs, the subcarrier spacing of a control channel (e.g., PDCCH), the subcarrier spacing of the downlink data channel (e.g., PDSCH), and the numerology of the downlink data channel, and the base station may schedule data in a set of symbols in the determined at least one slot. The position may be at least one of a starting symbol of data carried on the downlink data channel, a number of consecutive symbols (e.g., length) of the data carried on the downlink data channel, and/or a SLIV associated with the data carried on the downlink data channel.

In the context of FIGS. 4-5, the base station 502 may determine 526 a position associated with the downlink data channel 414. The base station 502 may determine 526 the position associated with the downlink data channel 414 that corresponds with the first value indicated by the SS/PBCH block 410 and the second value indicated by the DCI 406.

At operation 712, the base station may send data carried on the downlink data channel based on the position associated with the downlink data channel. In one aspect, the downlink data channel may be a PDSCH, and the data carried on the downlink data channel may include RMSI. In the context of FIGS. 4-5, the base station 502 may send the RMSI 408 carried on the downlink data channel 414 at the position corresponding to the first value indicated by the SS/PBCH block 410 and the second value indicated by the DCI 406.

Figure 8:
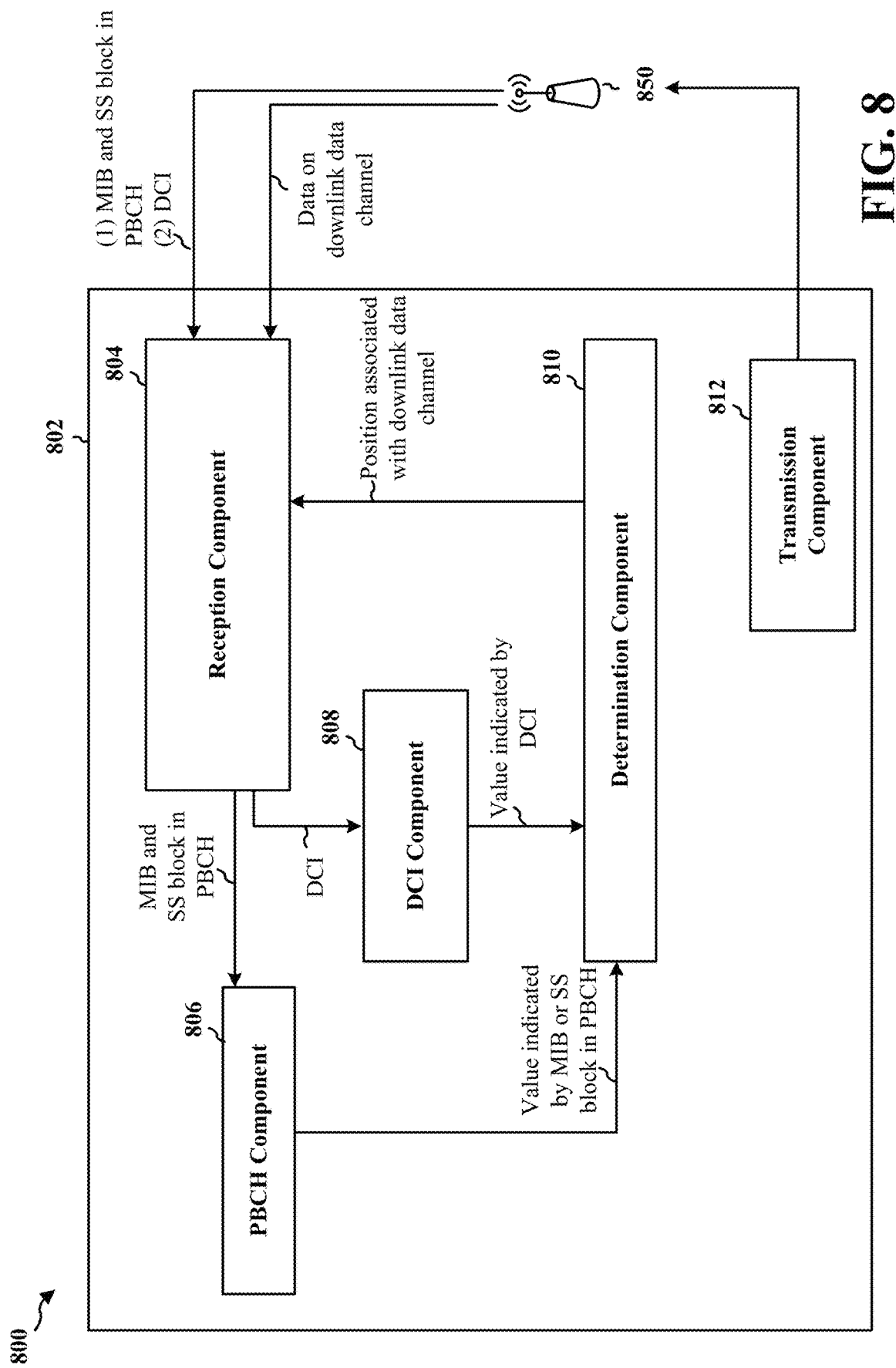
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus 802 may be a UE. The apparatus 802 may include a transmission component 812 configured to transmit signals, e.g., to a base station 850. The apparatus 802 may include a reception component 804, and may receive signals from a base station 850 through the reception component 804. For example, the reception component 804 may receive an SS/PBCH block that includes an MIB, and the MIB may indicate an allocation associated with a CORESET. Further, the reception component 804 may receive RMSI configuration information carried in the CORESET based on the allocation associated with the CORESET. The RMSI configuration information may be included in a payload of DCI. In one aspect, the DCI may be Format 1_0.

A PBCH component 806 may determine a first value indicated by the SS/PBCH block. The first value may be one of a multiplexing pattern, a symbol index for a search space set, a number of symbols associated with a CORESET, a number of search space sets per slot, a minimum system bandwidth, or an index of the SS/PBCH block. In one aspect, the PBCH component 806 may determine, based on the MIB included in the SS/PBCH block, at least one of the multiplexing pattern, the symbol index for the search space set, the number of symbols associated with the CORESET, or the number of search space sets per slot, and the first value may be based on the at least one of the multiplexing pattern, the symbol index for the search space set, the number of symbols associated with the CORESET, or the number of search space sets per slot. In another aspect, the PBCH component 806 may detect at least one of the minimum system bandwidth or the index of the SS/PBCH block based on the SS/PBCH block, and the first value may be based on the detected at least one of the minimum system bandwidth or the index of the SS/PBCH block.

A DCI component 808 may determine a second value indicated by the RMSI configuration information. For example, the DCI component 808 may decode a payload of DCI (e.g., DCI of Format 1_0) received from the base station 850 based on an RNTI associated with the apparatus 802. The second value may be based on the decoded payload. The RNTI may be one of a C-RNTI, a TC-RNTI, an RA-RNTI, an SI-RNTI, or a P-RNTI.

The determination component 810 may determine a position associated with a downlink data channel based on the first value indicated by the SS/PBCH block and based on the second value indicated by the RMSI configuration information. For example, the determination component 810 may access a table (e.g., a lookup table received from the base station 850 via RRC signaling) with the first value and the second value as an index, and the determination component 810 may identify an entry indicating the position associated with the downlink data channel that is indexed by the first value and the second value. The position may include at least one of a starting symbol of data on the downlink data channel, a number of consecutive symbols of data on the downlink data channel, or an SLIV.

The reception component 804 may receive data carried on the downlink data channel based on the position associated with the downlink data channel. The downlink data channel may be a PDSCH, and the data carried thereon may include RMSI.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
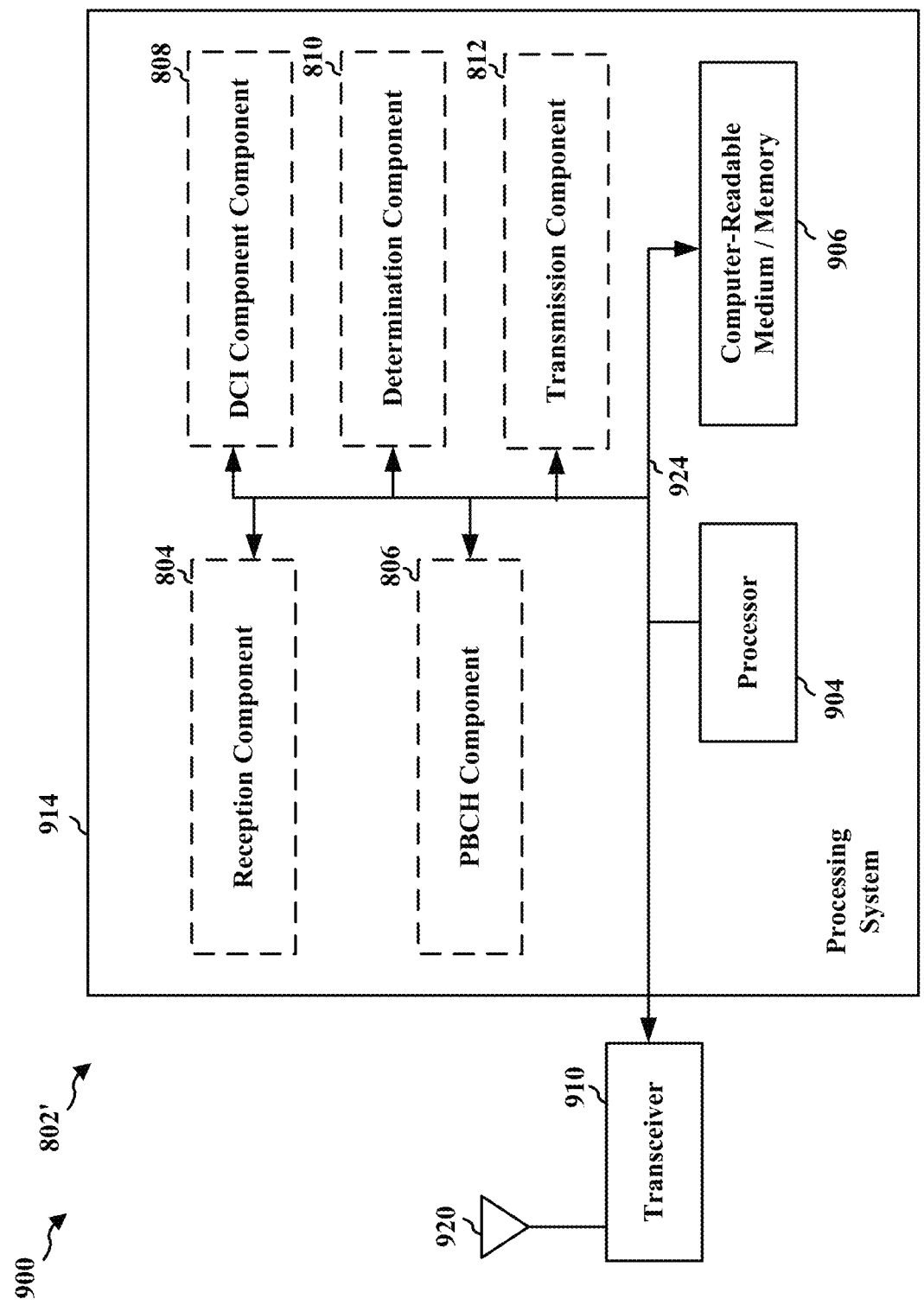
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812 and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for receiving an MIB and an SS block in a PBCH, the MIB indicating an allocation associated with a CORESET. The apparatus 802/802' includes means for RMSI configuration information carried in the CORESET based on the allocation associated with the CORESET. The apparatus 802/802' includes means for determining a position associated with a downlink data channel based on a first value indicated by one of the MIB or the SS block in the PBCH and based on a second value indicated by the RMSI configuration information. The apparatus 802/802' includes means for receiving data carried on the downlink data channel based on the position associated with the downlink data channel.

In an aspect, the downlink data channel comprises a PDSCH, and the received data comprises RMSI. In an aspect, the RMSI configuration information is included in a payload of DCI. In one aspect, the DCI may be Format 1_0. In an aspect, the first value comprises one of: a multiplexing pattern, a symbol index for a search space set, a number of symbols associated with the CORESET, a number of search space sets per slot, a minimum system bandwidth, or an SS block index.

The means for determining the position associated with the downlink data channel may be configured to determine, based on the MIB in the PBCH, at least one of the multiplexing pattern, the symbol index for the search space set, the number of symbols associated with the CORESET, or the number of search space sets per slot, and the first value is based on the at least one of the multiplexing pattern, the symbol index for the search space set, the number of symbols associated with the CORESET, or the number of search space sets per slot.

The means for determining the position associated with the downlink data channel may be configured to detect at least one of the minimum system bandwidth or the SS block index based on the one of the MIB or the SS block in the PBCH, and the first value is based on the at least one of the minimum system bandwidth or the SS block index.

The means for determining the position associated with the downlink data channel may be configured to decode the RMSI configuration information based on a radio network temporary identifier (RNTI) associated with the apparatus 802/802', and the second value is based on the decoded RMSI configuration information. The RNTI may be one of a C-RNTI, a TC-RNTI, an RA-RNTI, an SI-RNTI, or a P-RNTI.

In an aspect, the position of the downlink data channel is indicated by an entry in a table, and the entry in the table corresponds with the first value and the second value. In an aspect, the apparatus 802/802' may further include means for receiving the table via RRC signaling. In an aspect, the position associated with the downlink data channel comprises at least one of a starting symbol and a number of consecutive symbols associated with the data carried on the downlink data channel, or a SLIV that is based on the starting symbol and the number of consecutive symbols associated with the data carried on the downlink data channel.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
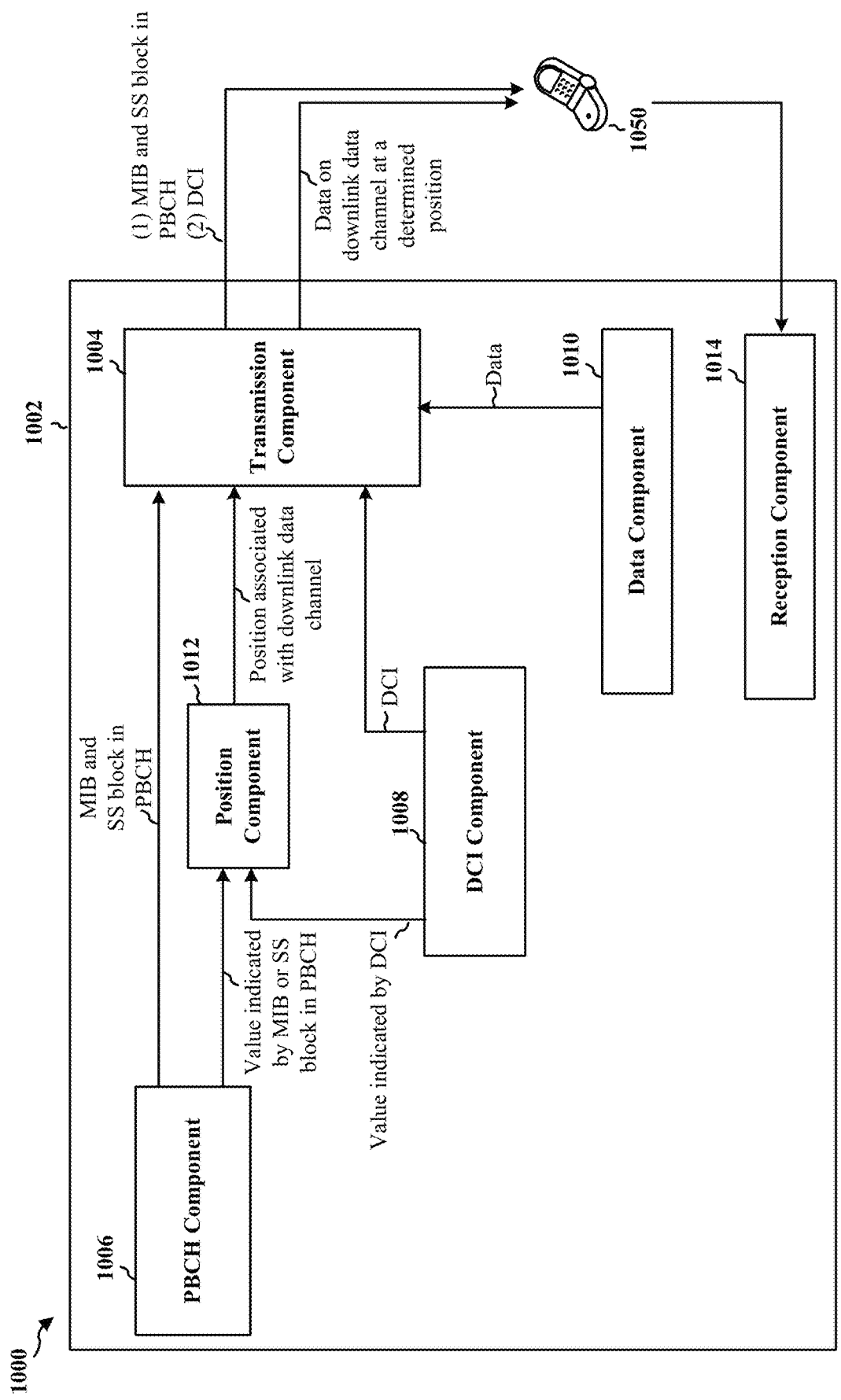
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be a base station. The apparatus 1002 may include a reception component 1014 configured to receive signals, e.g., from a UE 1050. The apparatus 1002 may include a transmission component 1004 configured to transmit signals, e.g., to a UE 1050.

A PBCH component 1006 may be configured to generate an SS block for transmission in a PBCH. The PBCH component 1006 may generate an MIB that indicates an allocation associated with a CORESET, and the MIB may be included in an SS/PBCH block. The SS/PBCH block may indicate a first value that partially indexes a table that includes entries showing correspondence between a position associated with a downlink data channel and the first value and a second value indicated by RMSI configuration information. The first value may include one of a multiplexing pattern, a symbol index for a search space set, a number of symbols associated with the CORESET, a number of search space sets per slot, a minimum system bandwidth, or an index of the SS block. In some aspects, the transmission component 1004 may send the table to the UE 1050 via RRC signaling.

A DCI component 1008 may be configured to generate a message indicating RMSI configuration information. In one aspect, the RMSI configuration information may be included in a payload of DCI (e.g., DCI of Format 1_0). The DCI component 1008 may scramble the RMSI configuration information using an RNTI, such as a C-RNTI, a TC-RNTI, an RA-RNTI, an SI-RNTI, or a P-RNTI. The RMSI configuration information may indicate a second value that partially indexes a table that includes entries showing correspondence between a position associated with a downlink data channel and the first value indicated by the SS/PBCH block and the second value.

The transmission component 1004 may send the SS block and the MIB in a PBCH, and the MIB may indicate the allocation associated with the CORESET. Further, the transmission component 1004 may send the RMSI configuration information carried in the CORESET based on the allocation associated with the CORESET.

A position component 1012 may determine a position associated with the downlink data channel. The position may correspond to the first value indicated by one of the MIB or the SS block in the PBCH and the second value indicated by the RMSI configuration information. The position may include one of a starting symbol of data on the downlink data channel, a number of consecutive symbols of the data on the downlink data channel, or a SLIV associated with the data on the downlink data channel.

The transmission component 1004 may send data on the downlink data channel at the determined position associated with the downlink data channel. The downlink data channel may be a PDSCH, and the data may include RMSI.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
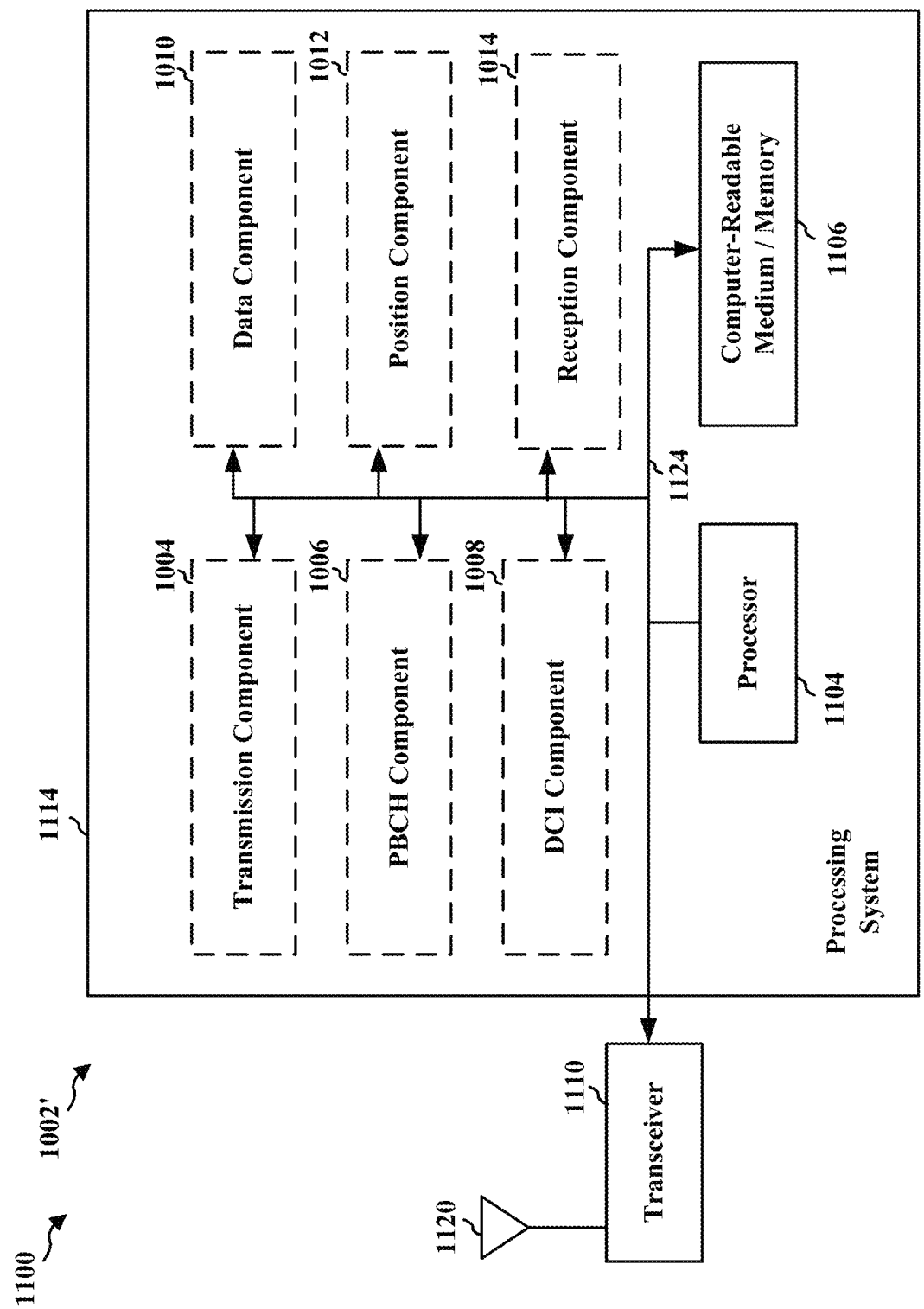
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1014. In addition, the transceiver 1110 receives information from the processing system 1114, specifically the transmission component 1004, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for sending an MIB and an SS block in a PBCH, the MIB indicating an allocation associated with a CORESET. The apparatus 1002/1002' may include means for sending RMSI configuration information carried in the CORESET based on the allocation associated with the CORESET. The apparatus 1002/1002' may include means for determining a position associated with a downlink data channel, the position associated with the downlink data channel corresponding to a first value indicated by one of the MIB or the SS block in the PBCH and a second value indicated by the RMSI configuration information. The apparatus 1002/1002' may include means for sending data on the downlink data channel based on the position associated with the downlink data channel.

In an aspect, the downlink data channel comprises a PDSCH, and the data on the downlink data channel comprises RMSI. In an aspect, the RMSI configuration information is included in a payload of DCI. In one aspect, the DCI may be Format 1_0.

The apparatus 1002/1002' may include means for sending, via RRC signaling, a table indicating the determined position and indicating the correspondence of the determined position to the first value indicated by the one of the MIB or the SS block in PBCH and the second value indicated by the RMSI configuration information. In an aspect, the first value comprises one of: a multiplexing pattern, a symbol index for a search space set, a number of symbols associated with the CORESET, a number of search space sets per slot, a minimum system bandwidth, or an SS block index.

The apparatus 1002/1002' may further include means for scrambling the RMSI configuration information based on a RNTI associated with a UE, the RMSI configuration information indicating the second value. In an aspect, the RNTI comprises one of a C-RNTI, a TC-RNTI, an RA-RNTI, an SI-RNTI, or a P-RNTI. In an aspect, the position associated with the downlink data channel comprises at least one of a starting symbol and a number of consecutive symbols associated with the data carried on the downlink data channel, or an SLIV that is based on the starting symbol and the number of consecutive symbols associated with the data carried on the downlink data channel.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   receiving a master information block (MIB) and a synchronization signal (SS) block in a physical broadcast channel (PBCH), the MIB indicating an allocation associated with a control resource set (CORESET);
   receiving remaining minimum system information (RMSI) configuration information carried in the CORESET based on the allocation associated with the CORESET;
   determining a position of a set of resources granted on a downlink data channel based on a combination of a first value indicated by one of the MIB or the SS block in the PBCH and a second value indicated by the RMSI configuration information; and
   receiving data carried on the downlink data channel based on the position of the set of resources granted on the downlink data channel.

2. The method of claim 1, wherein the downlink data channel comprises a physical downlink shared channel (PDSCH), and wherein the received data comprises RMSI.

3. The method of claim 1, wherein the RMSI configuration information is included in a payload of downlink control information (DCI).

4. The method of claim 3, wherein the DCI is Format 1_0.

5. The method of claim 1, wherein the first value comprises one of:
- a multiplexing pattern,
- a symbol index for a search space set,
- a number of symbols associated with the CORESET,
- a number of search space sets per slot,
- a minimum system bandwidth, or
- an SS block index.

6. The method of claim 5, wherein the determining the position of the set of resources granted on the downlink data channel comprises:
- determining, based on the MIB in the PBCH, at least one of the multiplexing pattern, the symbol index for the search space set, the number of symbols associated with the CORESET, or the number of search space sets per slot,
- wherein the first value is based on the at least one of the multiplexing pattern, the symbol index for the search space set, the number of symbols associated with the CORESET, or the number of search space sets per slot.

7. The method of claim 5, wherein the determining the position of the set of resources granted on the downlink data channel comprises:
- detecting at least one of the minimum system bandwidth or the SS block index based on the one of the MIB or the SS block in the PBCH,
- wherein the first value is based on the at least one of the minimum system bandwidth or the SS block index.

8. The method of claim 1, wherein the determining the position of the set of resources granted on the downlink data channel comprises:
- decoding the RMSI configuration information based on a radio network temporary identifier (RNTI) associated with the UE,
- wherein the second value is based on the decoded RMSI configuration information.

9. The method of claim 8, wherein the RNTI comprises one of a cell RNTI (C-RNTI), a temporary C-RNTI (TC-RNTI), a random access RNTI (RA-RNTI), a system information RNTI (SI-RNTI), or a paging RNTI (P-RNTI).

10. The method of claim 1, wherein the position of the set of resources granted on the downlink data channel is indicated by an entry in a table, and the entry in the table corresponds with the first value and the second value.

11. The method of claim 10, further comprising:
- receiving the table via radio resource control (RRC) signaling.

12. The method of claim 1, wherein the position of the set of resources granted on the downlink data channel comprises at least one of a starting symbol and a number of consecutive symbols associated with the data carried on the downlink data channel, or a start and length indicator value (SLIV) that is based on the starting symbol and the number of consecutive symbols associated with the data carried on the downlink data channel.

13. A method of wireless communication by a base station, the method comprising:
- sending a master information block (MIB) and a synchronization signal (SS) block in a physical broadcast channel (PBCH), the MIB indicating an allocation associated with a control resource set (CORESET);
- sending remaining minimum system information (RMSI) configuration information carried in the CORESET based on the allocation associated with the CORESET;
- determining a position of a set of resources granted on a downlink data channel, the position of the set of resources granted on the downlink data channel being indicated by a combination of a first value indicated by one of the MIB or the SS block in the PBCH and a second value indicated by the RMSI configuration information; and
- sending data on the downlink data channel based on the position of the set of resources granted on the downlink data channel.

14. The method of claim 13, wherein the downlink data channel comprises a physical downlink shared channel (PDSCH), and wherein the data on the downlink data channel comprises RMSI.

15. The method of claim 13, wherein the RMSI configuration information is included in a payload of downlink control information (DCI).

16. The method of claim 15, wherein the DCI is Format 1_0.

17. The method of claim 13, further comprising:
- sending, via radio resource control (RRC) signaling, a table indicating the determined position and indicating the correspondence of the determined position to the combination of the first value indicated by the one of the MIB or the SS block in the PBCH and the second value indicated by the RMSI configuration information.

18. The method of claim 13, wherein the first value comprises one of:
- a multiplexing pattern,
- a symbol index for a search space set,
- a number of symbols associated with the CORESET,
- a number of search space sets per slot,
- a minimum system bandwidth, or
- an SS block index.

19. The method of claim 13, further comprising:
- scrambling the RMSI configuration information based on a radio network temporary identifier (RNTI) associated with a user equipment (UE), the RMSI configuration information indicating the second value.

20. The method of claim 17, wherein the RNTI comprises one of a cell RNTI (C-RNTI), a temporary C-RNTI (TC-RNTI), a random access RNTI (RA-RNTI), a system information RNTI (SI-RNTI), or a paging RNTI (P-RNTI).

21. The method of claim 13, wherein the position of the set of resources granted on the downlink data channel comprises at least one of a starting symbol and a number of consecutive symbols associated with the data carried on the downlink data channel, or a start and length indicator value (SLIV) that is based on the starting symbol and the number of consecutive symbols associated with the data carried on the downlink data channel.

22. An apparatus for wireless communication, the apparatus comprising:
- a memory; and
- at least one processor coupled to the memory and configured to:
  - receive a master information block (MIB) and a synchronization signal (SS) block in a physical broadcast channel (PBCH), the MIB indicating an allocation associated with a control resource set (CORESET);

receive remaining minimum system information (RMSI) configuration information carried in the CORESET based on the allocation associated with the CORESET;

determine a position of a set of resources granted on a downlink data channel based on a combination of a first value indicated by one of the MIB or the SS block in the PBCH and a second value indicated by the RMSI configuration information; and receive data carried on the downlink data channel based on the position of the set of resources granted on the downlink data channel.

23. The apparatus of claim 22, wherein the downlink data channel comprises a physical downlink shared channel (PDSCH), and wherein the received data comprises RMSI.

24. The apparatus of claim 22, wherein the RMSI configuration information is included in a payload of downlink control information (DCI).

25. The apparatus of claim 22, wherein the first value comprises one of:
a multiplexing pattern,
a symbol index for a search space set,
a number of symbols associated with the CORESET,
a number of search space sets per slot,
a minimum system bandwidth, or
an SS block index.

26. The apparatus of claim 25, wherein the determination of the position of the set of resources granted on the downlink data channel comprises to:
determine, based on the MIB in the PBCH, at least one of the multiplexing pattern, the symbol index for the search space set, the number of symbols associated with the CORESET, or the number of search space sets per slot,
wherein the first value is based on the at least one of the multiplexing pattern, the symbol index for the search space set, the number of symbols associated with the CORESET, or the number of search space sets per slot.

27. The apparatus of claim 25, wherein the determination of the position of the set of resources granted on the downlink data channel comprises to:

detect at least one of the minimum system bandwidth or the SS block index based on the one of the MIB or the SS block in the PBCH,
wherein the first value is based on the at least one of the minimum system bandwidth or the SS block index.

28. The apparatus of claim 22, wherein the determination of the position of the set of resources granted on the downlink data channel comprises to:
decode the RMSI configuration information based on a radio network temporary identifier (RNTI) associated with the apparatus,
wherein the second value is based on the decoded RMSI configuration information.

29. An apparatus for wireless communication, the apparatus comprising:
a memory; and
at least one processor coupled to the memory and configured to:
send a master information block (MIB) and a synchronization signal (SS) block in a physical broadcast channel (PBCH), the MIB indicating an allocation associated with a control resource set (CORESET);
send remaining minimum system information (RMSI) configuration information carried in the CORESET based on the allocation associated with the CORESET;
determine a position of a set of resources granted on a downlink data channel, the position of the set of resources granted on the downlink data channel being indicated by a combination of a first value indicated by one of the MIB or the SS block in the PBCH and a second value indicated by the RMSI configuration information; and
send data on the downlink data channel based on the position of the set of resources granted on the downlink data channel.

30. The apparatus of claim 29, wherein the downlink data channel comprises a physical downlink shared channel (PDSCH), and wherein the data on the downlink data channel comprises RMSI, and wherein the RMSI configuration information is included in a payload of downlink control information (DCI).

* * * * *